US010812869B2

(12) United States Patent
Shenkler et al.

(10) Patent No.: US 10,812,869 B2
(45) Date of Patent: Oct. 20, 2020

(54) PERSONALIZED INTEGRATED VIDEO USER EXPERIENCE

(71) Applicant: SONY CORPORATION, Tokyo (JP)

(72) Inventors: Andrew M. Shenkler, Marina Del Ray, CA (US); Loren H. McRoss, San Jose, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/981,683

(22) Filed: Dec. 28, 2015

(65) Prior Publication Data

US 2016/0198239 A1   Jul. 7, 2016

Related U.S. Application Data

(60) Provisional application No. 62/099,897, filed on Jan. 5, 2015.

(51) Int. Cl.
*H04N 21/234* (2011.01)
*H04N 21/2365* (2011.01)
(Continued)

(52) U.S. Cl.
CPC ......... *H04N 21/812* (2013.01); *A63F 13/245* (2014.09); *A63F 13/352* (2014.09);
(Continued)

(58) Field of Classification Search
None
See application file for complete search history.

(56) References Cited

U.S. PATENT DOCUMENTS 6,729,884 B1   5/2004   Kelton
7,020,704 B1   3/2006   Lipscomb et al.
(Continued)

FOREIGN PATENT DOCUMENTS

CN   103905846 A   7/2014
EP   2958067 A1   12/2015
(Continued)

OTHER PUBLICATIONS

"European Search Report", dated Feb. 10, 2017 for European Patent Application No. EP16187693.3.
(Continued)

*Primary Examiner* — Brian T Pendleton
*Assistant Examiner* — Jean D Saint Cyr
(74) *Attorney, Agent, or Firm* — Haverstock & Owens LLP

(57) ABSTRACT

A personalized integrated video user experience enables a user to view full screen streaming content utilizing an overlaid user interface to navigate throughout the experience. Included in the experience is scrubber branding as well as embedded unlockable contextual content that is presented to the user at specified times. The embedded unlockable or promotion of either digital contextual content or physical contextual goods is related to the content being streamed and enhances the user experience by enabling the user to perform additional actions such as purchasing items and acquiring additional information. An NFC-enabled or Bluetooth® device is able to be used to authenticate the experience as well as navigate content and interact with the streaming experience for an educational experience.

20 Claims, 16 Drawing Sheets

(51) Int. Cl.

| | | |
|---|---|---|
| *H04N 21/238* | (2011.01) | |
| *H04N 21/24* | (2011.01) | |
| *H04N 21/258* | (2011.01) | |
| *H04N 21/6373* | (2011.01) | |
| *H04N 21/647* | (2011.01) | |
| *H04N 21/81* | (2011.01) | |
| *H04N 21/2387* | (2011.01) | |
| *H04N 21/84* | (2011.01) | |
| *H04N 21/422* | (2011.01) | |
| *H04N 21/431* | (2011.01) | |
| *H04N 21/478* | (2011.01) | |
| *H04N 21/4784* | (2011.01) | |
| *G06Q 30/02* | (2012.01) | |
| *A63F 13/352* | (2014.01) | |
| *A63F 13/61* | (2014.01) | |
| *A63F 13/537* | (2014.01) | |
| *A63F 13/245* | (2014.01) | |
| *H04W 4/80* | (2018.01) | |

(52) U.S. Cl.
CPC ............ *A63F 13/537* (2014.09); *A63F 13/61* (2014.09); *G06Q 30/0269* (2013.01); *H04N 21/2387* (2013.01); *H04N 21/23424* (2013.01); *H04N 21/25883* (2013.01); *H04N 21/4222* (2013.01); *H04N 21/4312* (2013.01); *H04N 21/4784* (2013.01); *H04N 21/47815* (2013.01); *H04N 21/84* (2013.01); *H04W 4/80* (2018.02); *G06F 2203/04804* (2013.01)

(56) References Cited

U.S. PATENT DOCUMENTS

| | | | |
|---|---|---|---|
| 7,395,339 B2 | 7/2008 | Kirkland | |
| 8,009,318 B2 | 8/2011 | Sakamoto | |
| 8,775,631 B2 | 7/2014 | Luna | |
| 8,918,902 B1* | 12/2014 | Kim | G06F 21/31 726/28 |
| 8,955,001 B2 | 2/2015 | Bhatia et al. | |
| 9,002,747 B2 | 4/2015 | Pedlow et al. | |
| 9,237,377 B2 | 1/2016 | Bhatia et al. | |
| 9,277,157 B2 | 3/2016 | Averbuch | |
| 9,342,835 B2 | 5/2016 | Fordyce, III et al. | |
| 2001/0042250 A1 | 11/2001 | Ishii | |
| 2002/0016736 A1 | 2/2002 | Cannon | |
| 2003/0171991 A1* | 9/2003 | Robbins | G06Q 30/0242 705/14.41 |
| 2004/0107439 A1 | 6/2004 | Hassell | |
| 2005/0097599 A1* | 5/2005 | Plotnick | G11B 27/005 725/32 |
| 2007/0219994 A1 | 9/2007 | Lemelson | |
| 2008/0003555 A1 | 1/2008 | Ekvall | |
| 2008/0881699 | 4/2008 | Haeuser | |
| 2008/0193102 A1 | 8/2008 | Tischer | |
| 2009/0007199 A1* | 1/2009 | La Joie | H04H 60/33 725/95 |
| 2009/0070600 A1 | 3/2009 | Diascorn | |
| 2009/0150553 A1 | 6/2009 | Collart et al. | |
| 2009/0106442 A1 | 8/2009 | Lui | |
| 2009/0276803 A1 | 11/2009 | Weaver | |
| 2010/0023966 A1 | 1/2010 | Shahraray | |
| 2010/0031162 A1 | 2/2010 | Wiser et al. | |
| 2010/0241961 A1 | 9/2010 | Peterson et al. | |
| 2010/0293598 A1 | 11/2010 | Collart et al. | |
| 2012/0092438 A1 | 4/2012 | Guzman Suarez | |
| 2012/0130819 A1 | 5/2012 | Willcock et al. | |
| 2012/0158637 A1 | 6/2012 | Kshetramade et al. | |
| 2012/0284413 A1 | 11/2012 | Miura | |
| 2012/0296682 A1 | 11/2012 | Kumar | |
| 2012/0304065 A1 | 11/2012 | Cai | |
| 2012/0309515 A1 | 12/2012 | Chung | |
| 2013/0014159 A1* | 1/2013 | Wiser | H04N 7/0122 725/34 |
| 2013/0022232 A1 | 1/2013 | Jacob et al. | |
| 2013/0097481 A1 | 4/2013 | Kotler | |
| 2013/0130587 A1 | 5/2013 | Cohen et al. | |
| 2013/0325525 A1 | 12/2013 | Boyd, Jr. | |
| 2013/0325954 A1 | 12/2013 | Cupala et al. | |
| 2014/0009562 A1 | 1/2014 | Hegde | |
| 2014/0040935 A1 | 2/2014 | Gharachorioo | |
| 2014/0047483 A1 | 2/2014 | Fairbanks | |
| 2014/0081739 A1 | 3/2014 | Kalb et al. | |
| 2014/0082522 A1 | 3/2014 | Gunderson | |
| 2014/0113552 A1 | 4/2014 | Siddiqui | |
| 2014/0149596 A1 | 5/2014 | Emerson, III | |
| 2014/0172635 A1 | 6/2014 | Tanaka et al. | |
| 2014/0259081 A1 | 9/2014 | Chatterjee | |
| 2014/0282759 A1* | 9/2014 | Harvey | H04N 21/4333 725/89 |
| 2015/0100993 A1 | 4/2015 | Lee et al. | |
| 2015/0121440 A1 | 4/2015 | Wong et al. | |
| 2015/0130703 A1* | 5/2015 | Ghajar | G06F 3/013 345/156 |
| 2015/0289023 A1 | 10/2015 | Richman | |
| 2015/0296180 A1 | 10/2015 | Shi | |
| 2015/0302457 A1 | 10/2015 | Azevado | |
| 2015/0302470 A1 | 10/2015 | Dru et al. | |
| 2015/0317686 A1 | 11/2015 | Tang et al. | |
| 2015/0319493 A1 | 11/2015 | Lynch | |
| 2016/0023043 A1* | 1/2016 | Grundy | A63B 21/06 482/8 |
| 2016/0063486 A1 | 3/2016 | Purves et al. | |
| 2016/0162882 A1 | 6/2016 | McClung, III | |
| 2016/0166227 A1 | 6/2016 | Tanaka | |
| 2016/0171511 A1 | 6/2016 | Goel et al. | |
| 2016/0171539 A1 | 6/2016 | Ganduri et al. | |
| 2016/0171540 A1 | 6/2016 | Mangipudi et al. | |
| 2017/0083196 A1 | 3/2017 | Hartrell | |

FOREIGN PATENT DOCUMENTS

| | | |
|---|---|---|
| TW | 201311327 A1 | 3/2013 |
| WO | 0243396 A2 | 5/2002 |
| WO | 0245304 A2 | 6/2002 |
| WO | 2013028578 A1 | 2/2013 |
| WO | 2013138242 A1 | 9/2013 |
| WO | 2014071264 A1 | 5/2014 |

OTHER PUBLICATIONS

European Search Report from European Application No. 16187494.6.

European Search Report from European Application No. 16187474.8.

The Chinese Office Action issued in the Chinese Patent Application No. 201610811825.0 dated Apr. 3, 2019.

The Chinese Office Action from Chinese Application No. 201580072302.2 dated Aug. 27, 2019.

The Summons to Oral Proceedings dated Jun. 28, 2019, of European Patent Application No. EP16187693.3.

The Office Action dated Jun. 28, 2019, of Australian Patent Application No. AU2018226482.

The Office Action dated Aug. 1, 2019, of Australian Patent Application No. AU2018222976.

Jason Parker, "LookAway Player for iOS review: Pausing video by eye? There's an app for that—CNET", Apr. 11, 2013 (Apr. 11, 2013), XP055593864, Retrieved from the Internet: URL:https://www.cnet.com/reviews/lookaway-player-ios-review/ [retrieved on Jun. 4, 2019].

Gareth Beavis, "Samsung Galaxy S4 review: p. 3 / TechRader", Aug. 17, 2015 (Aug. 17, 2015), XP055593879, Retrieved from the Internet: URL:https://www.techradar.com/reviews/phones/samsung-galaxy-s4-1137602/review/3 [retrieved on Jun. 4, 2019].

The Summons to Oral Proceedings dated Apr. 25, 2019, of European Patent Application No. EP16187474.8.

The Patent Examination Report No. 1 dated Apr. 18, 2019 of Australian Patent Application No. AU2018220063.

(56) References Cited

OTHER PUBLICATIONS

The Chinese Office Action dated Mar. 5, 2020 from Chinese Patent Application No. 201580072302.2.
Video Browser for Sony TV,https;//play.google.com/store/apps/details?id=tv.zappo.webzaptvsony, Android Apps on Google Play, p. 1-4,.
Ooyala, Player Developer Guide, www.ooyala.com, 2008-2016, p. 1-4.
The 3rd Examination Report dated May 12, 2020 for Australian Patent Application No. 2018226482.
The European Office Action dated May 14, 2020 for European Patent Application No. 16 187 494.6.

* cited by examiner

PERSONALIZED INTEGRATED VIDEO USER EXPERIENCE

CROSS-REFERENCE TO RELATED APPLICATION(S)

This application claims priority under 35 U.S.C. § 119(e) of the U.S. Provisional Patent Application Ser. No. 62/099,897, filed Jan. 5, 2015 and titled, "PERSONALIZED INTEGRATED VIDEO USER EXPERIENCE," which is hereby incorporated by reference in its entirety for all purposes.

FIELD OF THE INVENTION

The present invention relates to the field of content (e.g. video) consumption, and more particularly, to an application which provides for a personalized interactive content consumption user experience.

BACKGROUND OF THE INVENTION

With portable devices, for example, laptop computers, tablet computers and cellular telephones becoming commonplace, access to and consumption of video and television content has become easier than ever before. With the myriad types and genres of content available for consumption, consumers may be inundated with myriad choices to select. Various streaming websites now offer similar user interfaces and experiences, which limit the individual's ability to stream, interact and view pertinent content. In addition to the large number of choices of content, each piece of content typically coincides with advertising from third party companies that want to sell products and/or services to users. These ads are typically not welcomed by the user as they are not applicable, related to the content that is being consumed, or of any interest.

SUMMARY OF THE INVENTION

The summary of the invention described herein merely provides exemplary embodiments and is not meant to be limiting in any manner.

A personalized integrated video user experience enables a user to view full screen streaming content utilizing an overlaid user interface to navigate throughout the experience. Included in the experience is scrubber branding as well as embedded unlockable contextual content that is presented to the user at specified times. The embedded unlockable or promotion of either digital contextual content or physical contextual goods is related to the content being streamed and enhances the user experience by enabling the user to perform additional actions such as purchasing items and acquiring additional information. A Near Field Communication (NFC)-enabled or Bluetooth® device is able to be used to authenticate the experience as well as navigate content and interact with the streaming experience for a highly interactive experience.

In one aspect, a method programmed in a non-transitory memory of a device comprises providing streaming content including a user interface overlay, wherein the streaming content is persistently streaming underneath the user interface overlay, displaying advertisement content within a video player during fast forwarding or rewinding of the streaming content, minimizing the user interface overlay during playback of the streaming content, providing contextual content related to the streaming content and enabling interactivity and decision making with the contextual content. The advertisement content is targeted toward an end user based on at least one of demographics, purchasing behavior, browsing behavior, streaming behavior, and personal preferences. The contextual content appears after a user watches a specified position in the streaming content or after the user watches a specified amount of the streaming content. The contextual content is dynamically available such that a content owner is able to position and manage the contextual content at any time. The user interface in which an end user navigates to explore content available, includes: descriptions of the streaming content, a plurality of images corresponding to the streaming content and the descriptions of the streaming content, and the contextual content associated with the streaming content, wherein each image of the plurality of images fade in or appear from a side of a screen, wherein a graphic associated with the contextual content is displayed proximate to a corresponding image of the plurality of images of the streaming content. The user interface overlay is on top of the streaming content which includes full screen streaming content running in the background. The user interface enables a user to access metadata related to the streaming content while playing the streaming content, and a user is able to hide or display the metadata on the user interface overlay via action buttons. The user interface provides commerce activities, wherein at a specific point in the streaming content, a dynamically programmed pop-up is displayed which enables accessing the contextual content, further wherein accessing the contextual content includes, but is not limited to purchasing music, providing coupons and promotional offerings and displaying bonus content. The method further comprises communicating with a system using a plush toy, wherein the plush toy is configured to provide input to the device simulating a remote control, to control authentication, general navigation, educational interaction to gain rewards geared towards commerce, and digital/physical redemptions throughout the system. The plush toy is configured to receive information from the device in order to communicate back to an end user progress made, a recommendation for future viewing and a reward earned. The method further comprises providing a content owner with a tool to modify the contextual content related to the streaming content, wherein the tool enables the content owner to select the contextual content and specify a time point or time amount to display the contextual content. The tool is accessible via a portal.

In another aspect, an apparatus comprises a non-transitory memory for storing an application, the application for: providing streaming content including a user interface overlay, wherein the streaming content is persistently streaming underneath the user interface overlay, displaying advertisement content within a video player during fast forwarding or rewinding of the streaming content, minimizing the user interface overlay during playback of the streaming content, providing contextual content related to the streaming content and enabling interactivity and decision making with the contextual content and a processing component coupled to the memory, the processing component configured for processing the application. The advertisement content is targeted toward an end user based on at least one of demographics, purchasing behavior, browsing behavior, streaming behavior and personal preferences. The contextual content appears after a user watches a specified position in the streaming content or after the user watches a specified amount of the streaming content. The contextual content is dynamically available such that a content owner is able to position and manage the contextual content at any time. The user interface in which an end user navigates to explore_ content available, includes: descriptions of the streaming content, a plurality of images corresponding to the streaming content and the descriptions of the streaming content, and the contextual content associated with the streaming content, wherein each image of the plurality of images fade in or appear from a side of a screen, wherein a graphic associated with the contextual content is displayed proximate to a corresponding image of the plurality of images of the streaming content. The user interface overlay is on top of the streaming content which includes full screen streaming content running in the background. The user interface enables a user to access metadata related to the streaming content while playing the streaming content, and a user is able to hide or display the metadata on the user interface overlay via action buttons. The user interface provides commerce activities, wherein at a specific point in the streaming content, a dynamically programmed pop-up is displayed which enables accessing the contextual content, further wherein accessing the contextual content includes, but is not limited to purchasing music, providing coupons and promotional offerings and displaying bonus content. The application is further for communicating with a system using a plush toy, wherein the plush toy is configured to provide input to the apparatus simulating a remote control, to control authentication, general navigation, educational interaction to gain rewards geared towards commerce, and digital/physical redemptions throughout the system. The plush toy is configured to receive information from the apparatus in order to communicate back to an end user progress made, a recommendation for future viewing and a reward earned. The application is further for providing a content owner with a tool to modify the contextual content related to the streaming content, wherein the tool enables the content owner to select the contextual content and specify a time point or time amount to display the contextual content. The tool is accessible via a portal.

In yet another aspect, a system comprises a computing device configured for: providing streaming content including a user interface overlay, providing contextual content related to the streaming content and enabling interactivity with the contextual content and a plush toy device configured for communicating with the computing device, wherein communicating affects the streaming content and the contextual content. The plush toy device includes a plurality of Near Field Communication (NFC) chips for communicating with the computing device, further wherein a first NFC chip of the plurality of NFC chips is positioned in a first location of the plush toy device and a second NFC chip of the plurality of NFC chips is positioned in a second location of the plush toy device. The first location is a left hand/palm of the plush toy device and the second location is a right hand/palm of the plush toy device. The plush toy device includes a wireless technology mechanism configured for exchanging data over short distances for communicating with the computing device. The plush toy device includes a wireless communication device for communicating with the computing device. The plush toy device includes an identification component which the computing device detects to identify the identity or character of the plush toy device, further wherein the identity or character of the plush toy device determines the streaming content and the contextual content. The plush toy device includes a user identification component which the computing device detects to identify the user of the plush toy device, further wherein the user of the plush toy device determines the streaming content and the contextual content. The plush toy device includes a speaker device to communicate suggestions, acting in place of a recommendation engine, to a user, further wherein the computing device communicates to the plush toy device to communicate with the user based on actions by the user. The plush toy device provides a user with an ability to interact on a plurality of educational games and interactions, further promoting rewards geared toward merchandise redemption and purchase, by having the user use the NFC chips of the plush toy to answer questions posed during streaming content.

In another aspect, an apparatus comprises a plush toy body and a communication device positioned within the plush toy body configured for communicating with a video device. The plush toy body includes a plurality of Near Field Communication (NFC) chips for communicating with the video device, further wherein a first NFC chip of the plurality of NFC chips is positioned in a first location of the plush toy body and a second NFC chip of the plurality of NFC chips is positioned in a second location of the plush toy body. The first location is a left hand/palm of the plush toy body and the second location is a right hand/palm of the plush toy body. The plush toy body includes a wireless technology mechanism configured for exchanging data over short distances for communicating with the computing device. The plush toy body includes a wireless communication device for communicating with the video device. The plush toy body includes an identification component which the video device detects to identify the identity or character of the plush toy body, further wherein the identity or character of the plush toy body determines the streaming content and the contextual content. The plush toy body includes a user identification component which the video device detects to identify the user of the plush toy body, further wherein the user of the plush toy body determines the streaming content and the contextual content. The plush toy body includes a speaker device to communicate suggestions, acting in place of a recommendation engine, to a user, further wherein the computing device communicates to the plush toy body to communicate with the user based on actions by the user. The plush toy body provides a user with an ability to interact on a plurality of educational games and interactions, further promoting rewards geared toward merchandise redemption and purchase, by having the user use the NFC chips of the plush toy body to answer questions posed during streaming content.

DETAILED DESCRIPTION OF THE PREFERRED EMBODIMENT

A system and method for providing a user with a personalized, interactive user experience when accessing, selecting and consuming, for example, viewing or listening to content such as movies, television programs or music is described herein. In an exemplary embodiment, the personalized user experience is provided by an application program, being executed on a client device which allows a user to select among a database of pre-recorded content, for example, movies, television programs, podcasts, or viewing live television programming. The application allows the user to control the content being consumed as well as provide for commercial interactions, for example, the purchasing or other downloading of contextual and/or personalized physical goods or digital content related to the content being consumed.

A web layer (or other layer) is displayed over full screen streaming video which provides the contextual linking for a more in-depth user experience and better analytics. A user interface navigation with unlockable content is overlaid on a full (e.g., maximized) or part screen streaming video.

The term "unlockable" used herein means "able to be unlocked." For example, if content or an object is locked initially, it is unlockable such that when a user performs a task (e.g., watches 10 minutes of a video), the locked content becomes unlocked content, so the user is able to select and access the content. In some embodiments, the term "content" used herein means "stream-able video content, physical products, promotional rewards, or other items."

The user interface navigation runs on top of the streaming video. The user is able to navigate and explore different content within a specific genre in the foreground while a montage (or other video) is playing in the background. In some embodiments, the user is able to obtain metadata related to the streaming video such as character biographies.

By providing the user with a personalized, interactive viewing experience, the user may be more likely to engage in commercial interactions within the application. In this manner, the user enjoys the viewing or listening experience, and the content providers are provided with a more likely customer for their goods or services.

Figure 1:
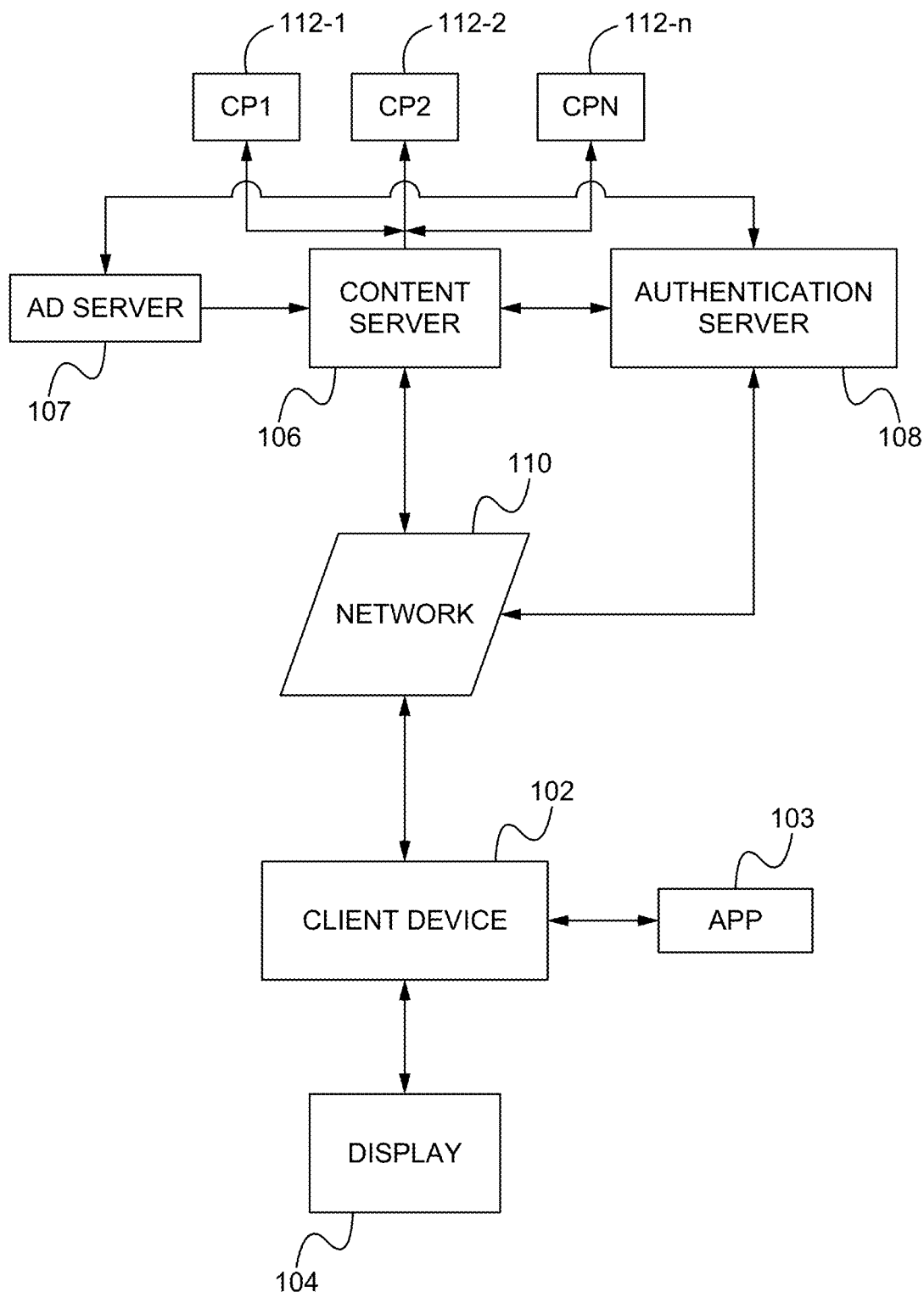
FIG. 1 is a schematic diagram of the personalized interactive user experience system according to some embodiments.

FIG. 1 illustrates a schematic diagram of the personalized interactive user experience system 100 according to an exemplary embodiment of the present invention. The system 100 includes a client device 102, for example, a laptop computer, a desktop computer, a tablet computer, a personal digital assistant, a set top box (STB), a game console, a mobile communication device, such as a mobile telephone, a smart phone and/or another suitable wearable device. For example, wearable technology (e.g., Fitbit) is able to be coupled to the system to transfer data in real-time. Furthering the example, a user's exercise information acquired using the wearable technology is transferred to the system, and based on the exercise information, the system provides advertising content or other contextual content (e.g., after determining the user has run 300 miles, new sneakers are advertised or a coupon is provided). The client device 102 may include an integrated memory for storing an application program 103 as described herein and a display device 104 for displaying the user interface, which may include the content being consumed. The display 104 may also be external to the client device 102, for example, a second screen implementation. In application, the client device 102 includes one or more processors for executing the application program 103 to provide the personalized interactive user experience.

The client 102 is connected to a content server 106 via an applicable local or wide area network 110, for example, the Internet. The client 102 is also coupled to an Ad server 107 and an authentication server 108. Content providers 112-1, 112-2 . . . 112-n, for example, movie studios, television studios, music distributors, game developers, broadcasters or other applicable content providers provide content as well as contextual advertising integrated within the content to the content server 106 for distribution and presentation on the client 102. In an alternate embodiment, the content providers 112-1, 112-2 . . . 112-n and as well as third party providers may provide applicable advertising to the Ad server 107 for later incorporation within the content maintained in the content server.

To ensure the best user viewing experience available, the content providers 112-1, 112-2 . . . 112-n store multiple versions of an applicable piece of content to the content server 106. For example, a movie may be encoded in a plurality of bit rates to provide for the transmission and display of the movie on a variety of different devices and a variety of different bandwidths. For example, a user that is a subscriber to a particular service may be provided with movies or other content at a higher bandwidth (or bit rate) than a user that may not be a subscriber and is using the service on a free service; thereby being provided with movies or other content at a lower bandwidth (or bit rate).

In those situations when the user wants to establish an account for purchasing or otherwise accessing premium content, the client 102 will connect to the content server 106 and the user of the client 102 will generate a profile and account. The profile may include the users name, e-mail contact, age, viewing and genre preferences and payment method for subsequent/recurring purchases. A user name and password will also be established as part of the profile generated in order to subsequently identify the user for future activities. This information may also be provided to the authentication server 108 for subsequent activities of the user. When the user wants to access the service, the user will enter their user name. The authentication server 108 may also be used to process payment of any sales to the user.

When the user wants to access the personalized content integration service, the user will activate the application program 103. The application program will connect the client 102 to the content server 106 or the authentication server 108, if applicable, to authenticate the user and allow the user to peruse the content available for consumption as discussed in greater detail below.

Figure 2:
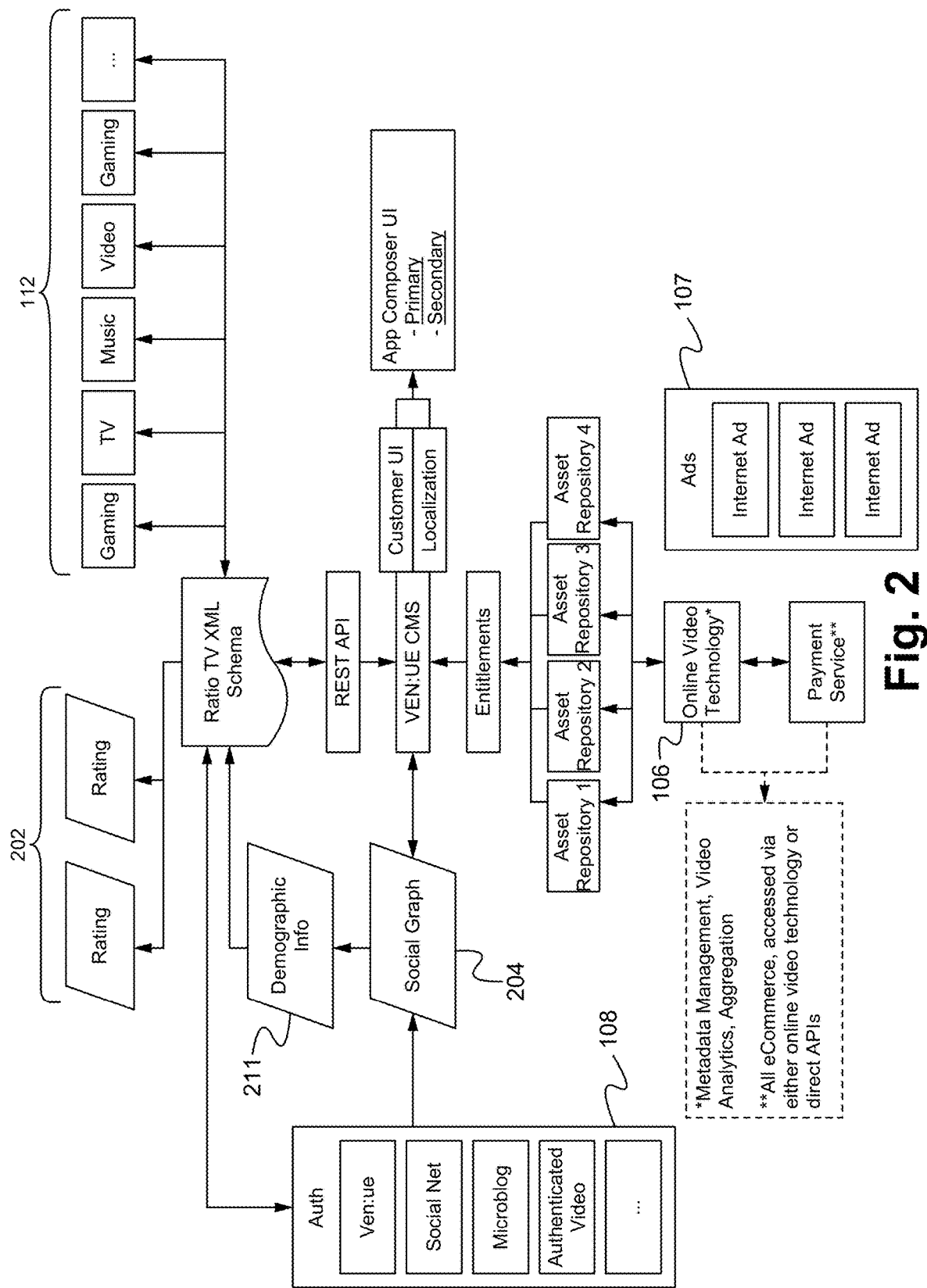
FIG. 2 is an expanded schematic diagram of the personalized interactive user experience according to some embodiments.

FIG. 2 is an expanded schematic view of the personal interactive user experience system of the present invention, including server side demographic information 211 that may be provided by the user when establishing their account. The demographic information 211 may also be provided via the users viewing, searching and purchasing habits. For example, based on the user's viewing, searching and purchasing habits, preference information (e.g., the genres and other types of information that a particular user prefers) is captured and stored in the demographic information 211 of the content server. Information relating to the social networking 204 activities of the user may also be captured and included in the user's profile. Based on the user's entered and captured demographic data, advertising targeted to the specific interests of the user may be presented during playback of content or at other times such as scrubbing the content. This may have the added effect of getting the user to be more engaged in the actual, and related, content the user is consuming as well as providing for commercial transactions to third party providers. Viewing rating information servers 202 are illustrated in FIG. 2 to illustrate how third party information may be obtained.

Figure 3A:
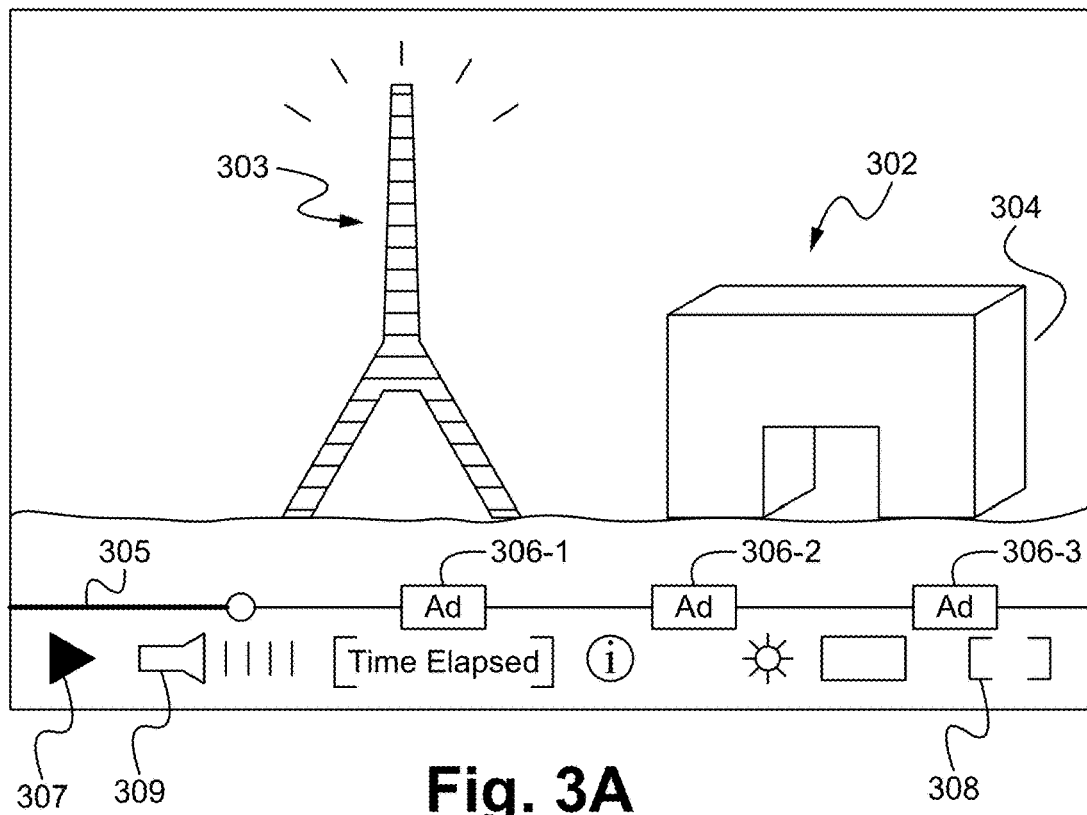
FIG. 3A is a schematic representation of the user interface according to some embodiments showing the presentation of targeted advertising.

FIG. 3A illustrates a schematic representation of the user interface 300 according to an exemplary embodiment showing the presentation of targeted advertising 306-1, 306-2, 306-3. As illustrated, the content being consumed 302 is provided in the background of the user interface 300. The display includes a timeline 305 and a play button 307 used to control the traversing of the content. In application, at predetermined time intervals of a movie, for example, advertisements 306-1, 306-2, 306-3 related to the interests of the user, based, for example, on the user's profile information are placed as animated graphics in the small JPEG images corresponding to the particular time period instead of the standard JPEG image of the corresponding content being displayed 302. This targeted advertising may be presented when the content is being displayed normally or when the user is scrubbing (e.g., fast forwarding or rewinding) the content. In this manner, the user may be provided with advertising that is of direct interest to them. In some embodiments, the ads 306-1, 306-2, 306-3 provided at the predetermined time points may be contextually related to the content being consumed. For example, if the content being displayed relates to France, the advertising may be directed to purchasing travel tickets to Paris or French clothing articles, for example, a beret or French influenced food.

In some embodiments, a player-in-player implementation is utilized. For example, a video player within a streaming video player is implemented. Furthering the example, a video advertisement is played within the streaming video player.

Figure 3B:
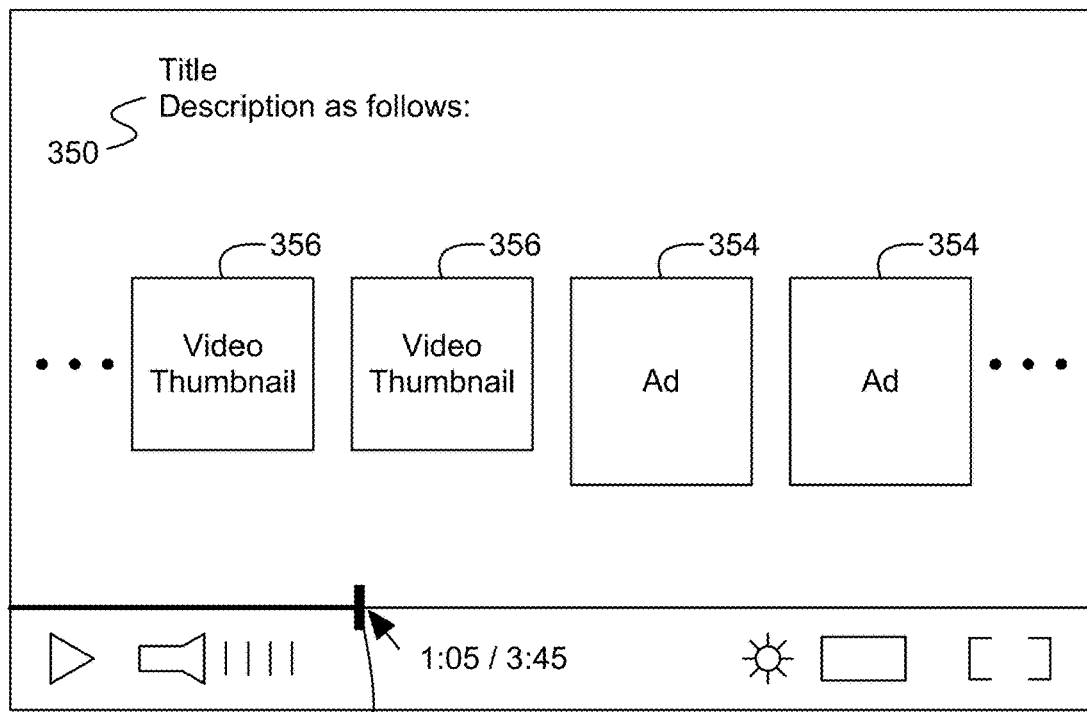
FIG. 3B illustrates an exemplary screenshot of the user interface according to some embodiments showing the presentation of targeted advertising.
Figure 4:
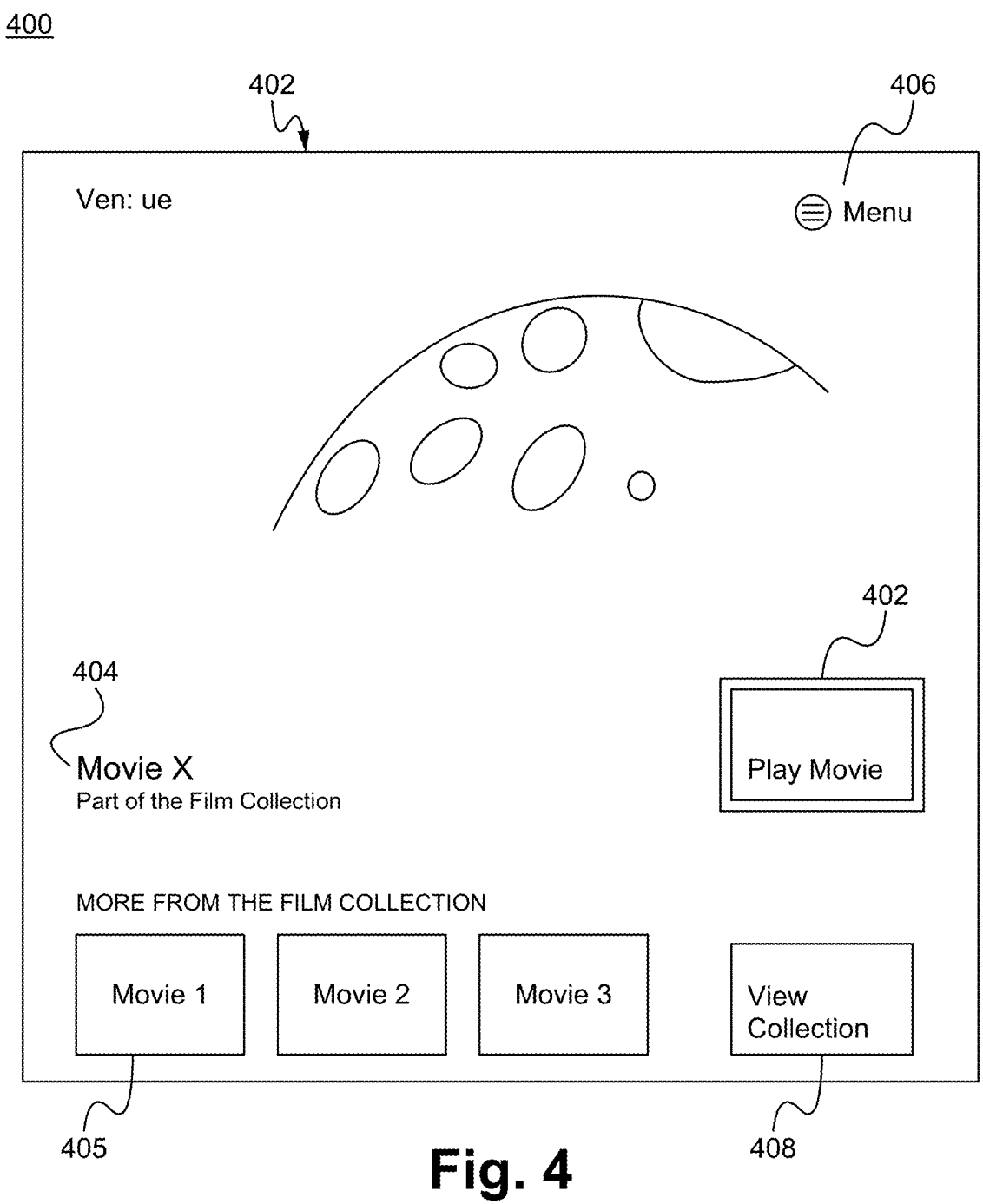
FIG. 4 illustrates the interactive user interface provided by the application program according to some embodiments.

As described herein, advertising is able to be displayed while a user is scrubbing content such as fast forwarding, rewinding or jumping to different locations in the content. FIG. 3B illustrates an exemplary screenshot of scrubbing content according to some embodiments. At the bottom of a video 300 that is being played, a timeline bar 352 is able to be selected and manipulated such that the video 350 is affected (e.g., fast forwarded). While the video 350 is being fast forwarded, instead of displaying a blank screen, thumbnail images of advertisements 354 (also referred to as advertisement content), instead of or in addition to video frames 356 from the video, are displayed above the timeline bar 352 as shown in FIG. 3B. For example, code is included in an application to display a thumbnail image from the video 350 on the screen in a specific location if that thumbnail image is available in memory, but if the thumbnail image of the video is not available, then the advertisement content (which may be pre-loaded in memory to ensure its availability) is displayed in the specific location until the video thumbnail image is available to replace the advertisement content. By pre-loading the advertisement content, bandwidth is saved when needed, and the user experience is improved such that instead of staring at a blank screen, some content is displayed for the user. In some embodiments, the advertisement content 354 is displayed until video thumbnails 356 (also referred to as video frames or video content) are available (e.g., have been downloaded or loaded into memory). In some embodiments, the advertisement content 354 is displayed for a set period of time (e.g., 1 second or 3 seconds). In some embodiments, the advertisement content 354 is displayed only while the user is scrubbing the video 350, and once the user releases the timeline bar 352 or selects play, the advertisement content 354 disappears or is replaced by the video thumbnails 356 or the video 350. In some embodiments, once each video thumbnail 356 is loaded, the advertisement content 354 is not displayed until the video thumbnail 356 is no longer loaded (e.g., after the video thumbnail is cleared from the cache/memory). The advertisement content 354 is able to be any kind of content such as still images, animated images (e.g., gifs), videos, text, and/or audio. In some embodiments, the advertisement content 354 is presented in a sequential manner. For example, the first advertisement thumbnail is followed by a second advertisement thumbnail and so on, and when viewed sequentially, the set of advertisement thumbnails forms a thought or presentation similar to flip books with a single static drawing on each page but when flipped quickly show movement. In some embodiments, the advertisement content 354 is targeted towards a user via demographics and/or other preferences (e.g., gender, age, location, income, occupation, personal preferences, viewing preferences, purchasing behavior, browsing history) and/or the advertisement content 354 is related to the video playing. In some embodiments, a single advertisement is repeatedly shown in the advertisement content 354 (e.g., first thumbnail through the last thumbnail are all the same), and in some embodiments, multiple advertisements are displayed in the advertisement content 354 (e.g., first thumbnail is an advertisement by Company X, second thumbnail is an advertisement by Company Y, and third thumbnail is an advertisement by Company Z). In some embodiments, the advertisement content 354 is generated by a third party (e.g., the advertiser) or by a host company (e.g., Sony®).

In some embodiments, the scrubber branding utilizes a 2-tier pricing structure for full subscription video on demand but includes an audio/video on demand entry opportunity driven by both standard marketing and using sharing and competition. For example, the on demand audio/video is able to be shared via social networking and/or any other mechanism. Additionally, revenue sharing is able to be implemented such that a sharer (e.g., site/source that shares content) is able to receive a share of revenue for driving purchasing through a contextually relevant affiliate link.

Figure 10:
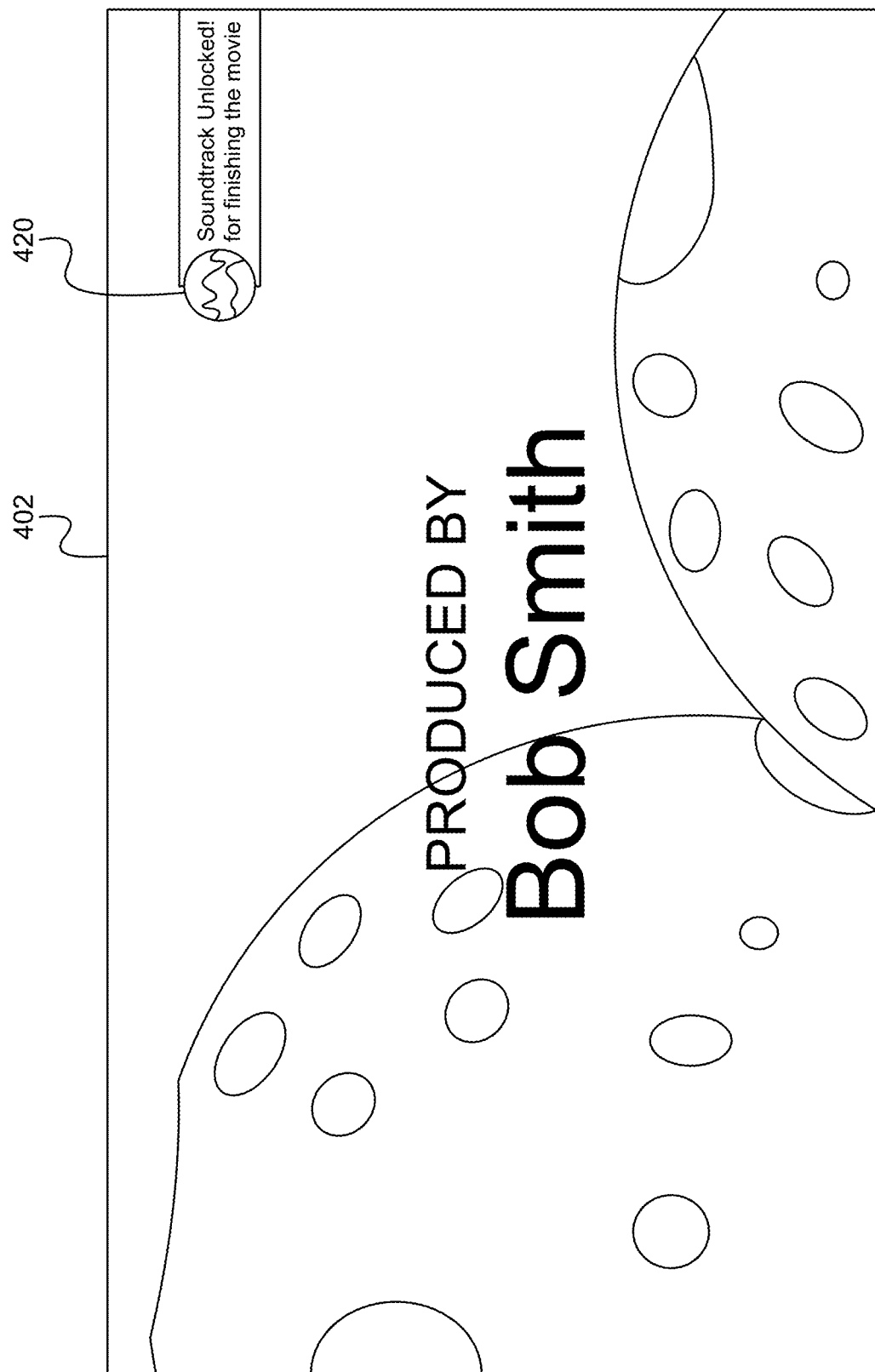

In a related implementation, FIG. 10 shows the user interface where an action bubble 420 is presented to the user indicating that contextual (e.g., related) material is available. In this case, a musical soundtrack relating to primary content being viewed is available for download (unlocked). In this example, at a predetermined time during the playback of the movie, the user is provided the opportunity to listen, download and/or purchase individual songs or an entire soundtrack (and/or other types of targeted merchandising relating to the streaming content) from the movie being consumed. The purchase or otherwise accessing of the soundtrack related to the movie being consumed is an example of contextual advertising that is provided to the user to enhance the user experience while being engaged in the corresponding movie. The targeted and contextual advertising and potential commercial transactions are examples of the advantages provided by the application program. Any type of content is able to be made available for rent, purchase or other access, such as images, music, videos, items (clothing, jewelry, equipment) and/or games. In some embodiments, the contextual material is available at a specific point in a video/movie (e.g., at the 10:00 mark of the video) or after the video has played for a certain amount of time (e.g., after the user watches 10 minutes of the movie—even if the user skips around, the cumulative time watched is able to be computed).

In some embodiments, an implementation is utilized to ensure the user actually watches the content. The system is able to respond/interact with the user to determine that the user is still watching or if they have left the screen, and if the content should be paused. For example, a video camera is able to detect the user or the user's eyes, and if the user is not in front of the screen or if the user is looking away, then the time is not accumulated. In another example, if another window or app is overlaid on the video, then the time accumulation is stopped. By monitoring or analyzing whether the user is watching the video prevents users from turning on the video and then leaving or doing something else simply to unlock contextual content, which would be a waste of bandwidth. In some embodiments, the monitoring and/or analysis is utilized to stop or pause the video to prevent a waste of bandwidth. For example, if the user is watching a video, and then receives a phone call, the video may still be playing in the background or on another device, and by detecting the user is not watching the video, the video is paused or stopped to assist the user and also to prevent a double use of bandwidth—first, while the user is distracted and second, when the user goes back to watch the part that was missed.

In some embodiments, commerce activities are able to be unlocked at contextual points in media experiences. During video playback, users are able to unlock commerce activities that include, but are not limited to, music, clothing, retail coupons and other types of merchandising options (physical and digital). For example, a user plays the video and at a specific time or after a specific amount of time (as described herein), an unlockable (meaning able to be unlocked) bubble or other item is displayed over the video to notify the user that the unlockable/bonus content is available. Examples of e-commerce include: music purchases (e.g., a pop-up is displayed during a contextual point of the video, and if the user clicks the pop-up, the user is brought to another user interface or a user interface within the current user interface where they are able to stream the audio track with an opportunity to purchase or stream in other services. Another pop-up is also displayed during the audio stream to return the user back to where they left off in the video. A pop-up is also able to display coupon codes for retail outlets and other various promotional campaign initiatives. A pop-up is able to display unlockable movie snippets, exclusive trailers and other bonus content.

FIGS. 4-9 illustrate the interactive user interface provided by the application program according to some embodiments. As described herein, the interactive user interface is able to be implemented on any device (e.g., computer, gaming console, smart phone and other devices). When the application program is executed, the user is taken to a main page 400 where the user may navigate to a particular piece of content for which they wish to consume. As illustrated, the main page has a user interface where content 402 (e.g., a video) is displayed in a background layer; the foreground layer may include bibliographic 404 and series collection (e.g., series) information 405 relating to a particular piece of content. Although illustrated as being presented along the horizontal axis of the interface, the bibliographic and corresponding series collection information may be presented along the vertical axis of the interface or any other orientation. The main display also includes a menu button 406, a play button 407 and a collection view button 408.

Figure 5:
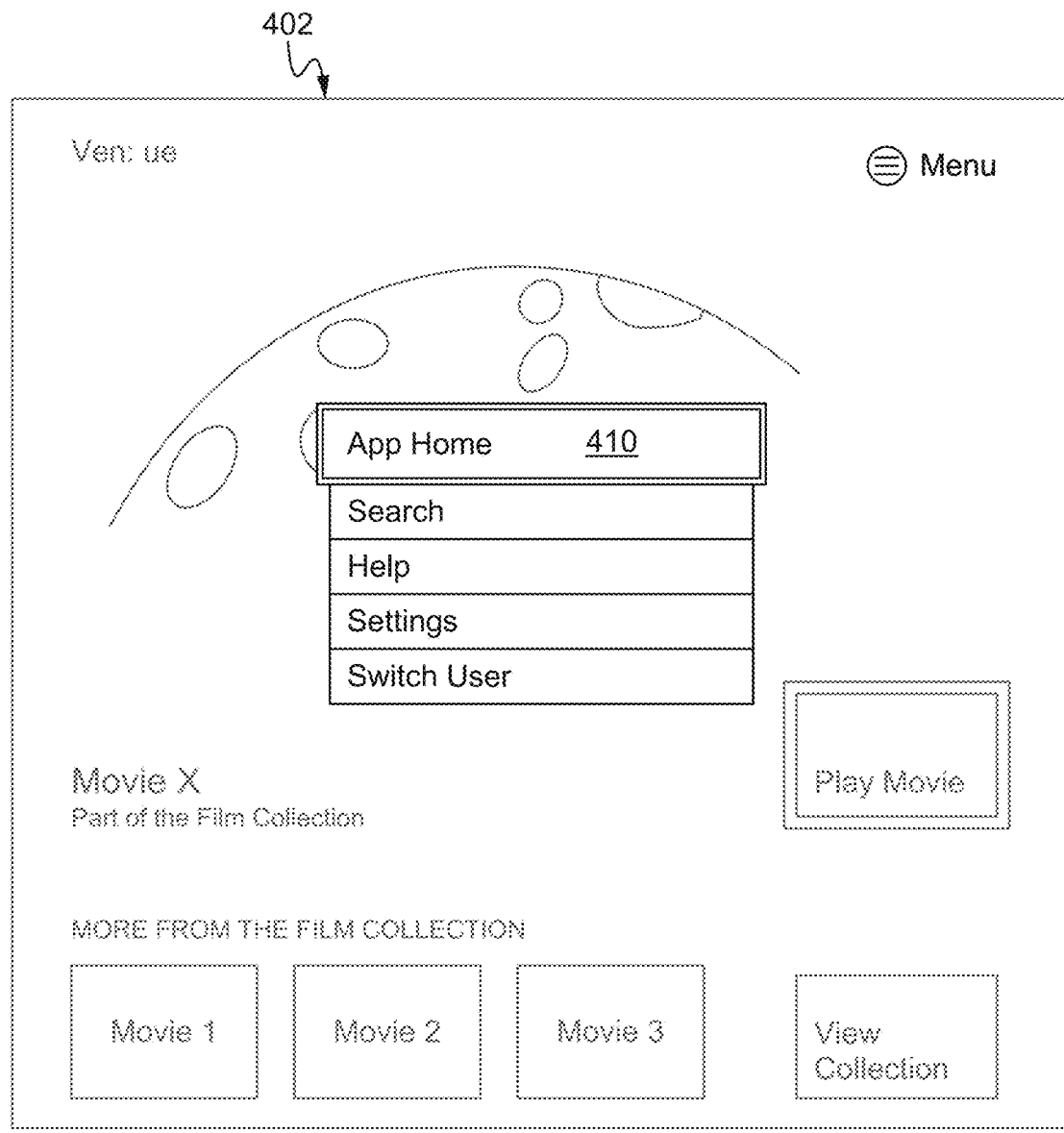
FIGS. 5-10 illustrate the interactive user interface provided by the application program according to some embodiments.

When the menu button 406 is activated or depressed, a main menu screen 410 is presented in the foreground layer of the display (FIG. 5). Each sub-button of the main menu corresponds to an action that may be taken. When the collection view button 408 is activated or depressed the several movies that correspond to a movie or television show franchise 412, 414 are presented in the foreground layer of the display (FIG. 6).

Figure 6:
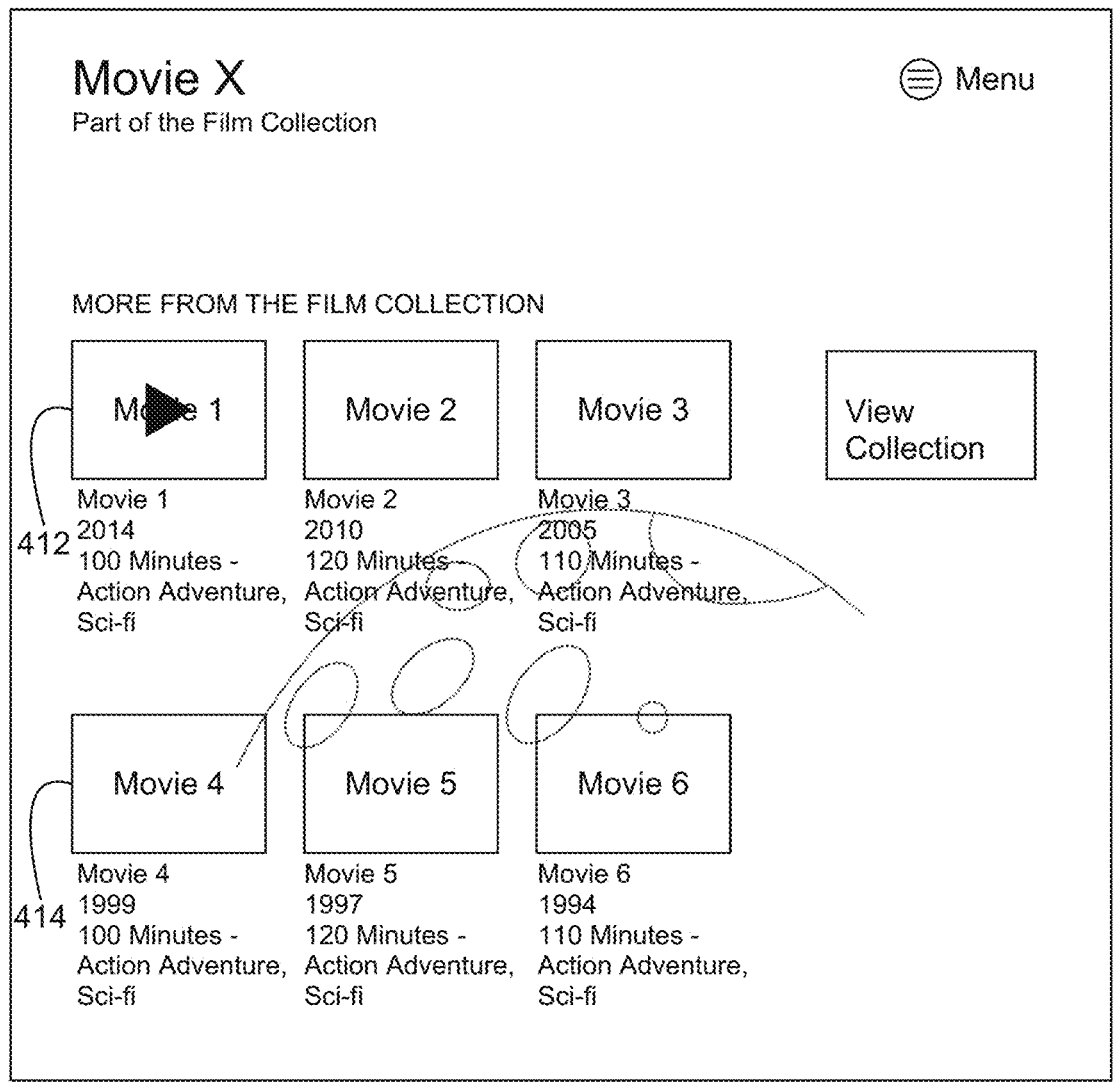
Figure 7:
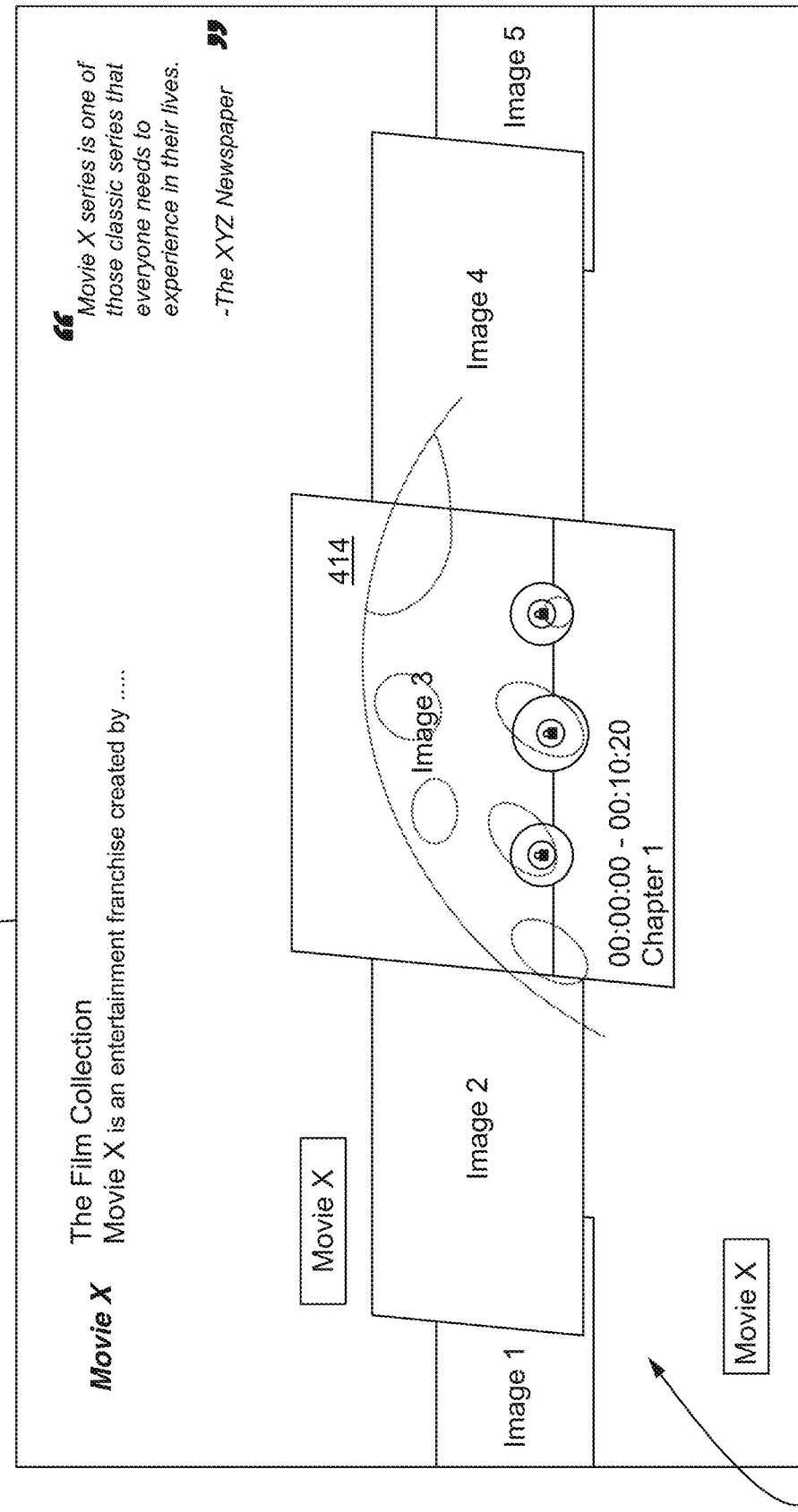
Figure 8:
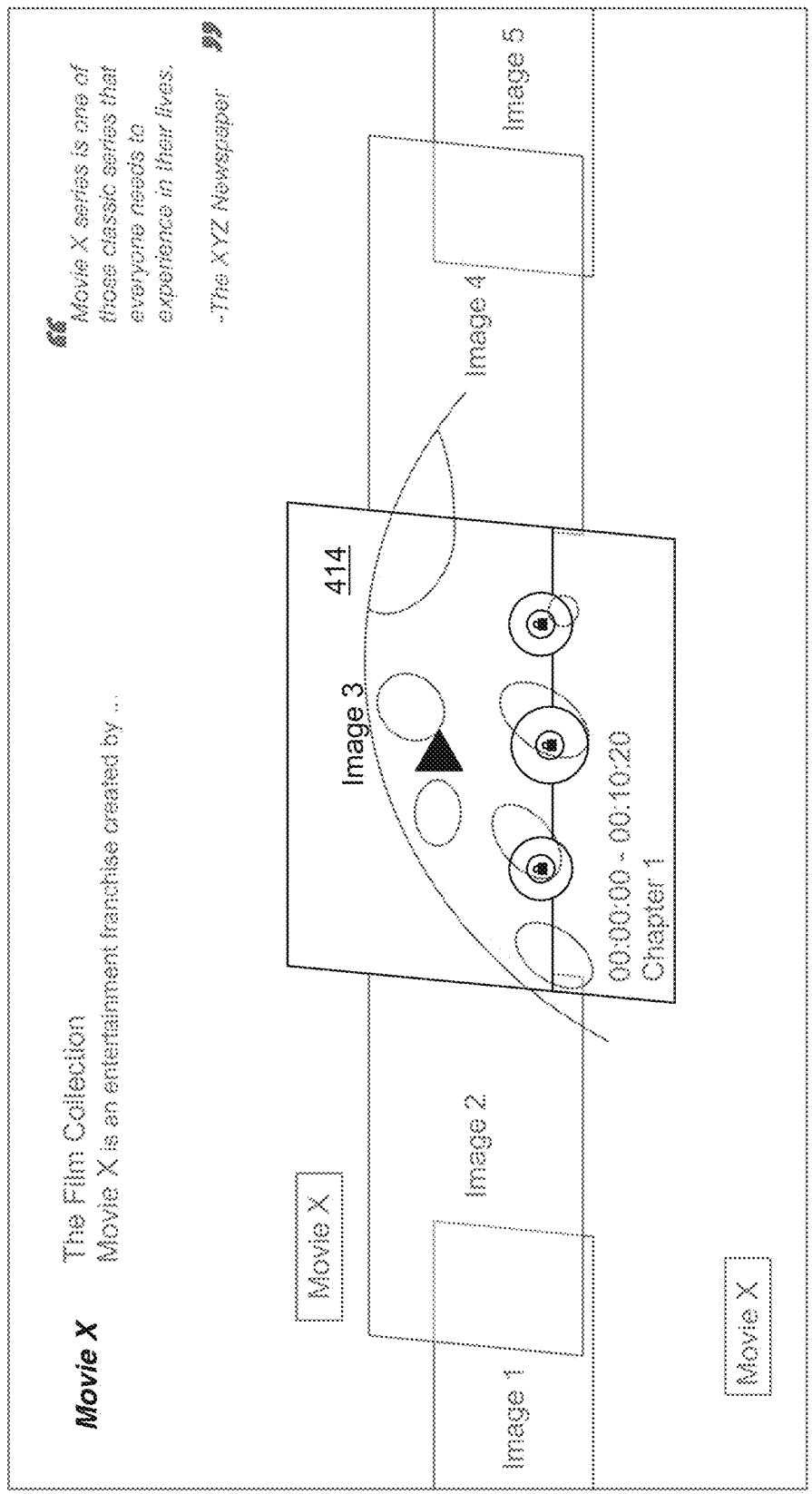

FIG. 7 illustrates the user interface presented on the display 104 (FIG. 1) when the movie is selected from the collection view of FIG. 6. As shown, the background layer 402 may include the movie being played; the foreground layer may include additional information 412 relating to the piece of content selected as well as a media player 414 configurable of playing the movie or other enhanced content, for example, behind the scenes footage related to the movie. The related information content 412 is only principally visible for a predetermined amount of time before its representation is grayed out so as to not be as visible (FIG. 8).

Figure 9:
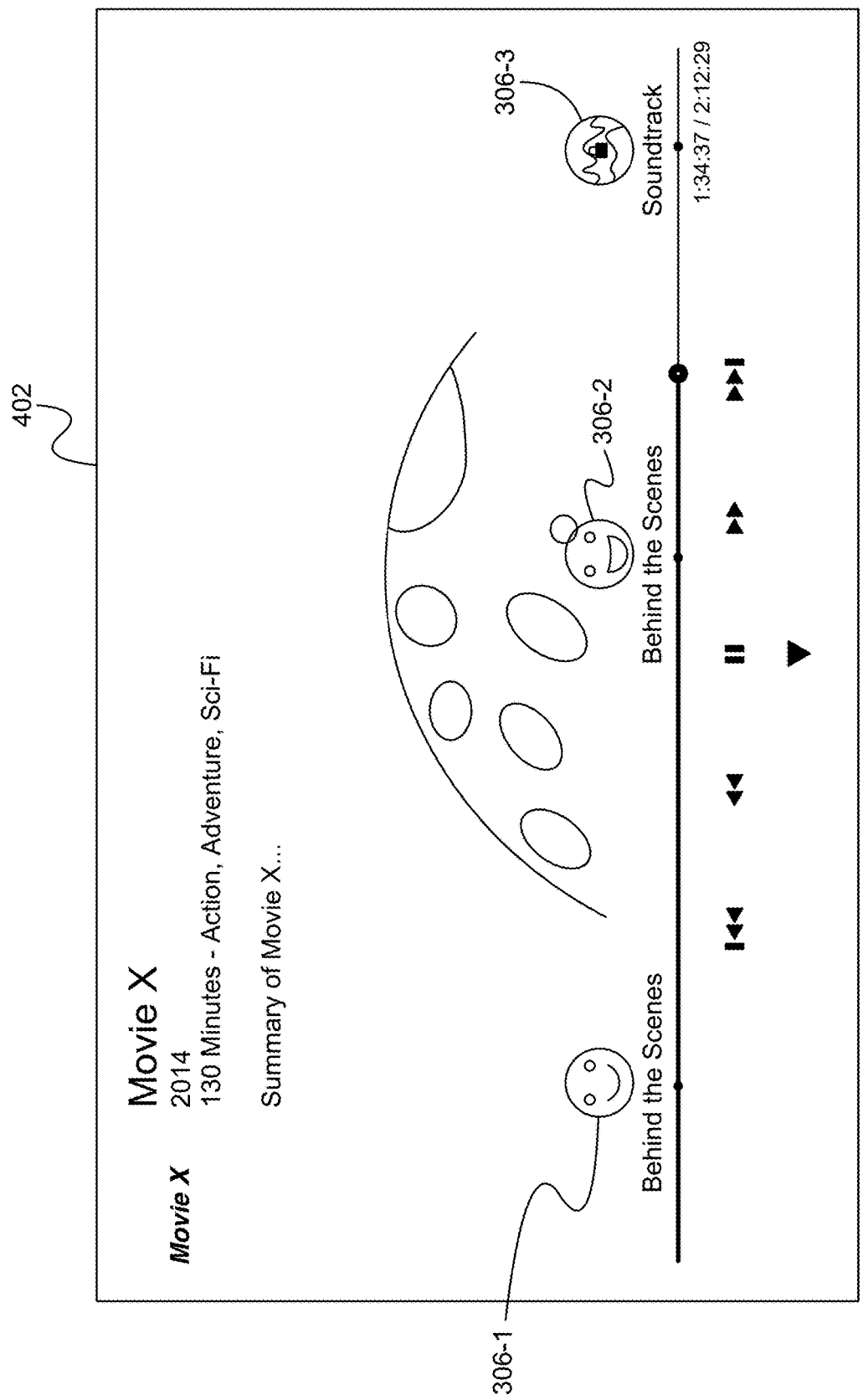

FIG. 9 illustrates the display when video content is being consumed. As shown, the movie content 402 is presented in the background layer. The media player controller, including forward, rewind, and pause functionality, is presented in the foreground layer. All user interface navigation runs on top of the content (which is being streamed). While browsing, the user may navigate and explore different content within a specific genre in the foreground layer while a montage is playing in the background layer (FIGS. 8-9). As shown, at particular time periods of the movie, the user may obtain behind the scenes information 306-1 related to the movie being played; behind the scenes information 306-2 and soundtrack information 306-3 may also be accessed by the user.

When the user selects enhanced information (e.g., behind the scenes information 306-1) relating to the movie being played, the movie is paused at the particular time point while the enhanced information is presented to the user. The enhanced information may include other unlockable information, for example, streaming audio, coupon codes and on-line merchandising store goods may be presented to the user. Once the user is finished viewing the enhanced information, the movie resumes from where it was paused. Depending on the bandwidth available to the user, the application program may request that the content be streamed at a greater or lesser bit rate to accommodate the currently available bandwidth. This bit rate adjustment may also be used to provide for second device viewing of paused content. In this situation, the user may have started viewing content, for example, on a game console but resumed playback on a tablet or smart phone. In such a situation, the content server will provide the current playback device with the paused content at a bit rate appropriate for the current playback device (e.g., tablet).

As mentioned above, advertising that is targeted to the particular user is integrated into and provided to the client as part of the content. The metadata corresponding to the targeted advertising is generated through video analytics and commerce analytics engaged in by the user when consuming video content and enhanced content. Site and experience analytics are also provided based on how users navigate through the experience. For example, video analytics relate to the types of videos users are watching most often, the videos the user may share with friends via social network or other types of recommendations, number of videos played, and average bitrate streaming thresholds. Commerce analytics include the click-thru and sell-thru rate of products, how well different products are performing and differences between products based on user preference. User analytics may also be captured, including the percentage of users making e-commerce purchases, drivers for the highest retention rates and how such information can best be expanded across a broader user group. Demographic data may also be captured to help better segment offerings for higher sell through and enable new content creation.

By capturing the aforementioned user information, content providers may view, for example, the unlockable content as such information relates to the video, then select specific content targeted towards the end-user and place the same at different timeframes or timecodes with the video or type of video that a particular user views most often, using an application linked to a service. The visual interface provides real-time media manipulation in streaming services.

A content owner (e.g., the producer of a video) is able to configure at a specific time or after a specific amount of time in a video, an unlockable bubble (or other graphic) to be displayed over the video to notify the user that bonus content is available. After a time period (e.g., 3-5 seconds), the unlocked node is partially hidden or minimized so as not to obscure the video, but the user is able to return to the unlockable node at any point.

Figure 11:
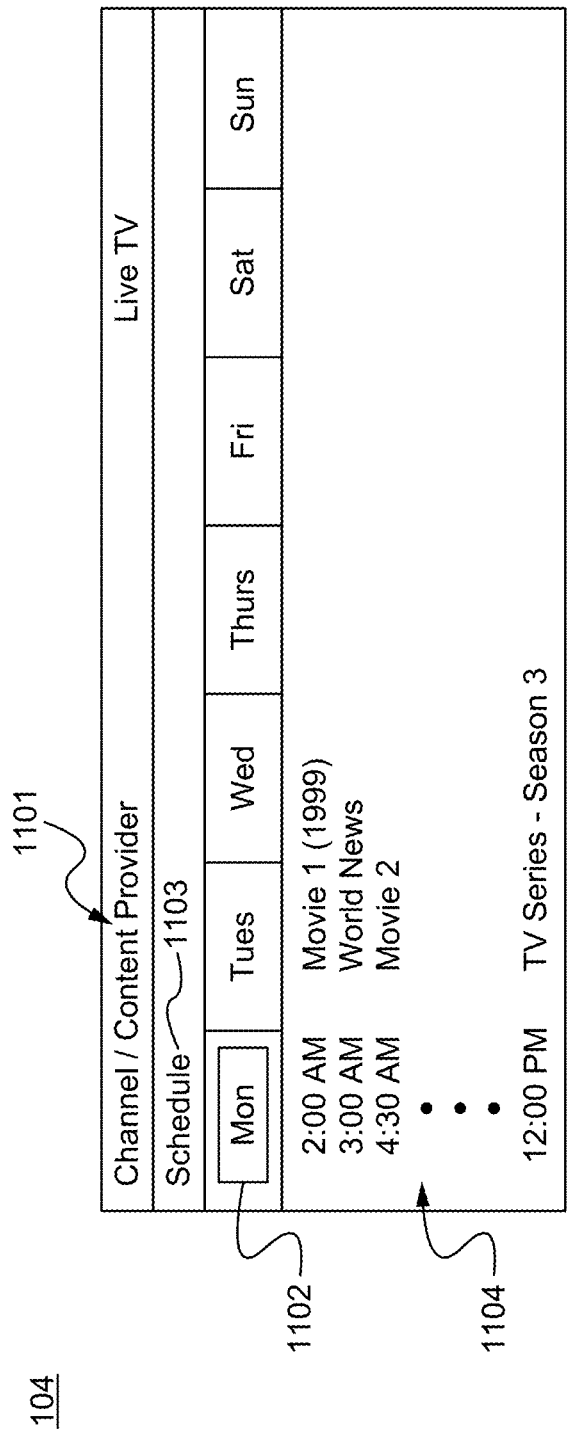
FIG. 11 is illustrates a program guide corresponding to live television provided by the application according to some embodiments.

FIG. 11 illustrates a user interface that is presented on the display when Live TV is selected. The program application may contact a content server whereby the user may select to view live broadcasts instead of stored (e.g., movie) content. In this situation, the user is presented with the illustrated user interface. As shown, the interface includes channel/content provider information. Schedule information 1103, including day 1102 and time 1104 is presented to the user. The user may select the programming corresponding to the current time. For example, at 3:00 AM, the user may watch the BBC World News live.

Figure 12:
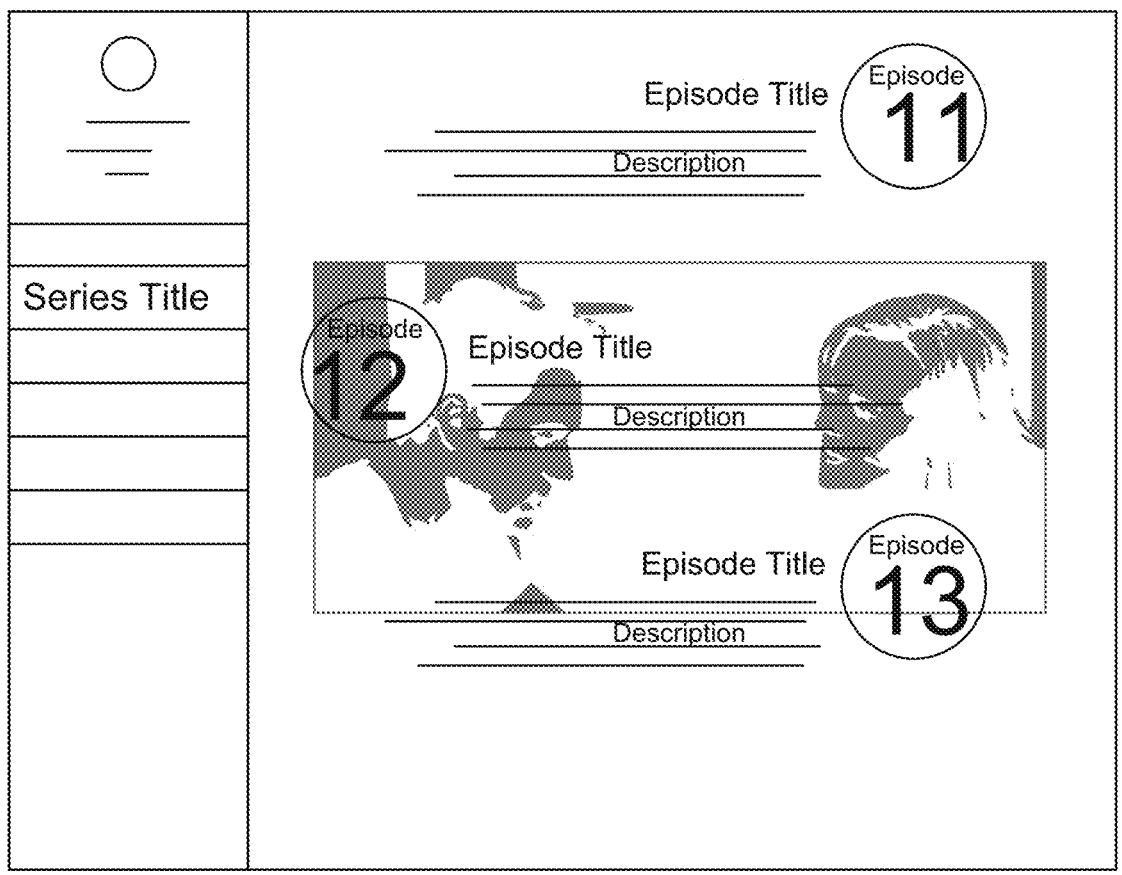
FIGS. 12-14 illustrate exemplary screenshots of a user interface overlaid on a streaming video according to some embodiments.
Figure 13:
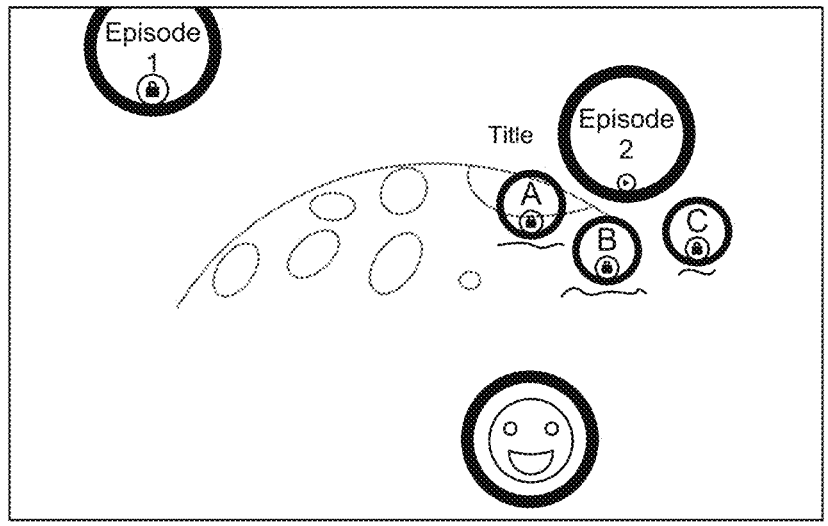
Figure 14:
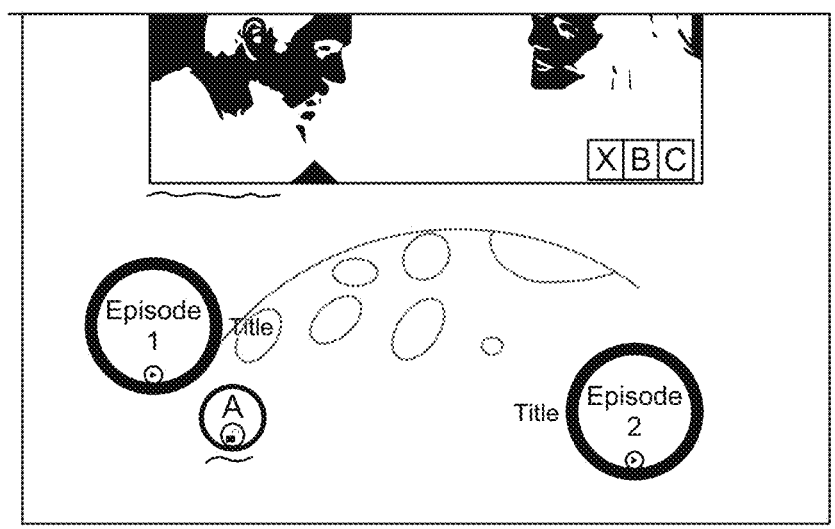

FIGS. 12-14 illustrate exemplary screenshots of a user interface overlaid on a streaming video according to some embodiments. In some embodiments, the user interface which is overlaid on the streaming video is semi-transparent, so that the video is able to be watched through the user interface, as shown in FIG. 12. The user interface is able to include descriptions of videos (e.g., episodes of a series) as well as images or thumbnails which show a screenshot from or related to the video. The user interface is scrollable up and down (or side to side), and when the user scrolls up and down, the description appears/disappears (e.g., fades in/fades out or disappears from the top or bottom of the screen), and the images come in from the side of the screen to be positioned next to the description. In some embodiments, parallax scrolling is implemented on the user interface, whereby the images appear from a small point in the screen and gradually get larger (to a certain point) or smaller as the user scrolls up or down. Additionally, smaller unlockable content pieces are displayed next to the image of the video. For example, the image of the video is similar to a planet, and the unlockable content is similar to moons orbiting the planet (FIG. 13). As described herein, the unlockable content is locked (meaning inaccessible) until the user performs an action such as watching 10 minutes of a video. In some embodiments, the unlockable content is shown but locked until the user performs the appropriate action, and in some embodiments, the unlockable content is not shown at all until the user performs the appropriate action, and then the unlockable content appears next to the video/episode image (or bubble) (FIG. 14). The unlockable content is able to be any content such as mini-sodes, soundtracks, artwork, video, games and never-before-seen content made available to the user as bonus content. For example, unlockable content includes a 4-minute description of Character X, so that a user is able to jump into the middle of a video series without having to watch the 10 previous episodes. The unlockable content may become available when Character X first appears in the current episode or at any other designated time. In some implementations, the same screen/view is displayed for disparate devices. For example, if a user watches a video with a user interface overlay on a tablet, and then watches the video on a smart television, and then watches the video using a game console, and then watches the video on a smart phone, the view is the same (aside from sizing differences such as images/icons being smaller on a 5 inch phone screen versus a 55 inch television screen), whereby unlockable content is able to be accessed on all device once unlocked on the user's initial view. Additionally, the video streaming with the user interface described herein is able to be utilized on a DVR.

When a user selects a video to watch, the majority of the user interface disappears, with the timeline bar positioned at the bottom (or elsewhere), and a minimized user interface placed at a corner of the screen (or elsewhere). In some embodiments, the minimized user interface (or a portion of the user interface such as the episode description and any unlockable content) hides (e.g., completely disappears) and then reappears when the user moves the cursor to a designated area (e.g., the bottom right corner). In some embodiments, the minimized user interface becomes semi-transparent and is positioned in the corner, so that it is not a distraction, yet is available for the user to access. The user is able to interact with the minimized user interface to make it appear and hide it. In some embodiments, as described herein, when a specific event occurs (e.g., a song is detected or a song is known to play at xx:xx time, a pop-up is displayed). For example, a pop-up is displayed to enable the user to access a high resolution, full version of a song where only a clip is played in a video. When the user selects the pop-up, the video is paused, and the user accesses the song, the user has the ability to stream the song in its entirety and also access links to purchase the song if they so choose. The user is then able to easily return to the video by selecting "return" or a similar implementation.

In some embodiments, when content is loading such as a new page or a new video instead of displaying a basic cursor or an hourglass, the cursor is modified based on the content loading. For example, a Sony® logo is displayed in place of the standard cursor when visiting Sony®-specific content. The specific logo is able to be retrieved from a database based on a content or site determination and is able to be targeted towards the end-user based on the content provider's preference, e.g., displaying a cartoon loader specific for an animated site.

Figure 15:
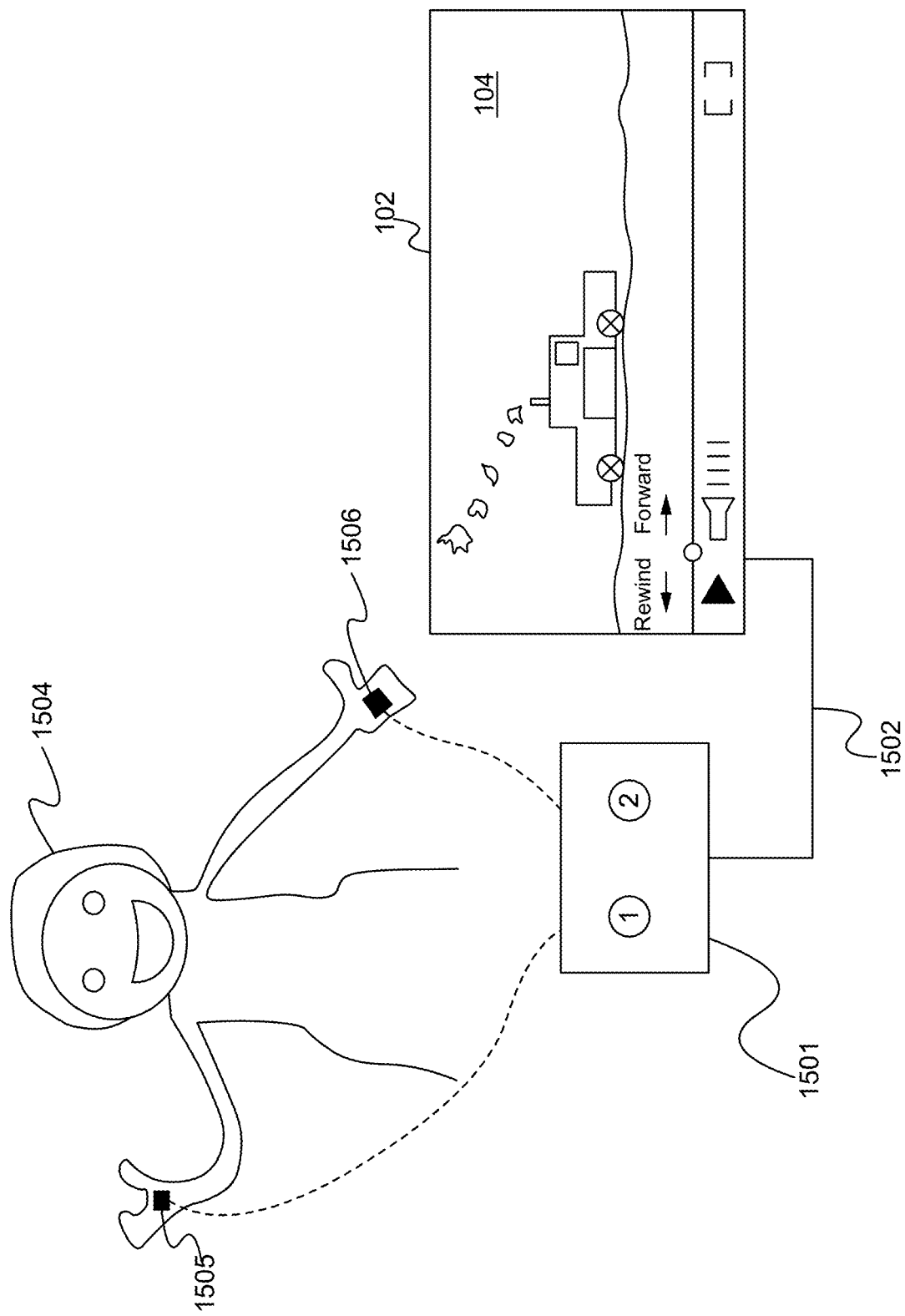
FIG. 15 is a schematic diagram illustrating the control of video playback according to some embodiments.

FIG. 15 is a schematic diagram illustrating the control of video playback according to some embodiments. Navigation of streaming content 104 may be controlled by using NFC or Bluetooth® control mechanisms. As illustrated, a plush toy (or stuffed animal) 1504 (or other object such as a doll, action figure/figurine or any other toy/object) has NFC chips 1505, 1506 sewn in both paws. The NFC chips communicate with the client device 102 via a controller shield 1501. The user interface will present a binary choice (e.g. 1, 2) to the user. The user decides which direction (e.g. forward, rewind) the video will take by touching the paw with the embedded NFC chip (or coming within a predetermined range such as 3 inches) to the controller shield 1501 that is connected to the client device 102 (e.g., plugged into a USB port of the client device 102). The controller shield 1501 then sends a keystroke of "1" or "2" to the user interface whereby the user interface then displays the video in the direction selected by the user. During video playback, the user is able to make decisions with the NFC enabled paws to interact with the video such as to unlock video content.

For example, a child uses a plush toy 1504 to move a selection cursor to make a selection (e.g., select an icon) which takes the user to another menu, plays a video, affects the video (e.g., pause, stop, fast forward, rewind, record), starts a game/activity, participate in the game/activity and/or any other action. The plush toy 1504 is also able to be used to interact with the system to answer questions. For example, a video plays and is programmed with a question that is presented to the child to answer. The child selects the answer using the plush toy 1504 (e.g., moving the left paw to select answer 1 or right paw to select answer 2 to the controller shield 1501). In some embodiments, the child is rewarded for answering the question correctly. In some embodiments, the child is able to control a story based on selections (e.g., if the child selects using the left paw, the character in the video will go down a left path and storyline Y is followed, and if the child selects using the right paw, the character in the video will go down the right path and storyline Z is followed).

In some embodiments, instead of or in addition to NFC chips, a wireless technology (e.g., Bluetooth®) is utilized to enable the object (e.g., plush toy) to communicate with a client device 102. In some embodiments, the object is able to talk and provide suggestions. For example, a plush toy 1504 includes a processor, memory, microphone, speakers and/or any other computing components, which are able to be programmed and used to communicate with a user. Furthering the example, a plush toy 1504 is programmed to provide suggestions to the user. For example, after a user watches a video about colors, the plush toy 1504 speaks and recommends to play a video about shapes. In some embodiments, the plush toy 1504 communicates with the client device 102 to receive progress information. For example, if a user watches a video about numbers that includes questions or plays a game about numbers, and the user gets many of the questions wrong, the plush toy is able to recognize that (e.g., by comparing the number of questions wrong initially or number of guesses per question or any other data with a threshold, and if the data is above a threshold, then the user did not do very well), and recommend redoing the video for more practice or recommending a similar video that is also about numbers. Additionally, the plush toy is able to encourage the child to continue the question/answer process (e.g., by providing sound clips of encouragement), so as to encourage growth and points/rewards bonus redemption. Similarly, if the data is below the threshold (e.g., it is determined the child answered all of the questions correctly), the plush toy is able to provide the child with praise and suggest a video/game in a different subject or harder problems in the same subject. In some embodiments, the plush toy is able to detect/sense surrounding information (e.g., recognize videos or music being played or voices/speech). In some embodiments, the plush toy is a relatively "dumb" terminal with capabilities to send and receive information as well as speak, but the analysis described herein (e.g., analyzing/tracking user performance/actions) is performed on another device such as the client device 102. For example, the client device 102 determines that user watched the same video 10 times in a row (where 10 is a threshold for suggesting a new video), so the client device 102 sends a signal to the plush toy to say, "how about we watch this new, different video," and a corresponding icon is displayed for the user to select.

In some embodiments, the client device 102 is able to detect/identify the plush toy character 1504 based on a specific signal sent by the plush toy 1504 (or any other detection method). For example, if two children each have a plush toy 1504, the client device 102 is able to detect Child A's plush toy character versus Child B's plush toy character, and different content is presented based on detecting the different plush toys and/or characters. For example, a welcome screen says, "Welcome, Child A" when Child A's plush toy is detected. Additionally, the client device 102 is able to store progress or visited content, such that if Child A has already completed a first level of a game related to a video, then by detecting Child A's plush toy, the client device 102 would go to a second level of the game; however, Child B has not completed the first level, so when Child B's plush toy character is detected, Child B is shown the first level of the game. Similarly, a location in a video could be saved for each child. For example, Child A left off at 4:55 in Video X, and Child B has only watched Video X to 1:20, so when Video X is selected, the video will begin at the respective positions based on detection of the specific plush toy. Also, different objects/plush toys may have different identifiers, such that when Plush Toy J is detected, a video with Plush Toy J is displayed, but if Plush Toy K is detected, then a video with Plush Toy K is displayed. In another example, when Plush toy J is detected, the user interface is a customized user interface focused on Plush Toy J (e.g., graphics, music, videos, options are focused on or related to Plush Toy J).

Figure 16:
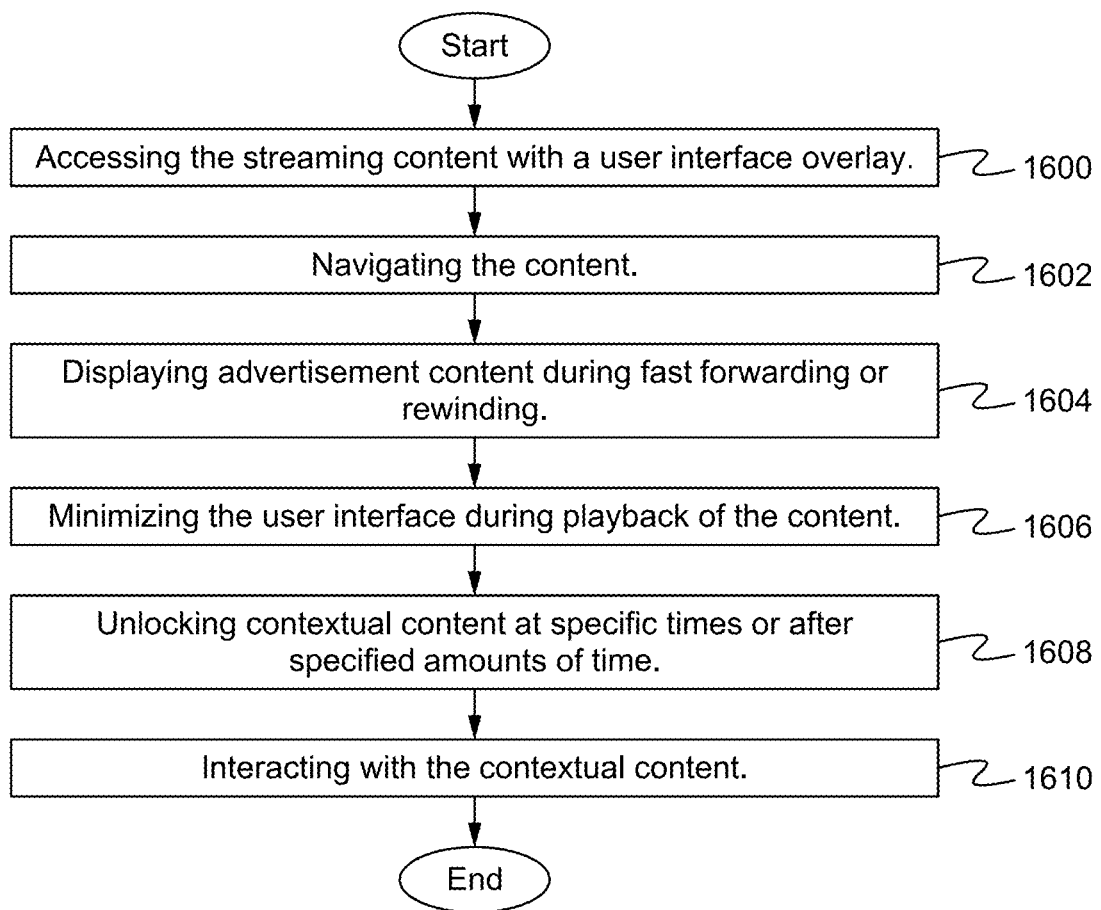
FIG. 16 illustrates a flowchart of a method of interacting with a streaming content and an overlaid user interface according to some embodiments.

FIG. 16 illustrates a flowchart of a method of interacting with a streaming content and an overlaid user interface according to some embodiments. In the step 1600, a user accesses streaming content which includes a user interface. For example, the user accesses the content through a browser or an app by selecting a link or icon. From the content provider perspective, the content is provided to the user using the browser/app. The content and/or user interface is able to be modified to provide the desired effects, interactions and/or contextual content by the content provider. In the step 1602, the user navigates the user interface by scrolling up and down (or left and right), and selecting content such as an episode. In the step 1604, if the user fast forwards or rewinds the content, advertisement content is displayed. In the step 1606, while the user is watching the streaming content, the user interface is substantially minimized but easily accessible to the user. In the step 1608, at specific times or after specific amounts of time, contextual content is unlocked for the user to access. Once the contextual content is unlocked, the user is able to interact with the contextual content, in the step 1610. The contextual content is able to be related to the user, to the content being displayed or a combination thereof. In some embodiments, fewer or additional steps are implemented, and/or the order of the steps is modified. For example, in some embodiments, interacting with the content includes using an NFC-enabled or wireless (e.g., Bluetooth®) device such as a plush toy.

Figure 17:
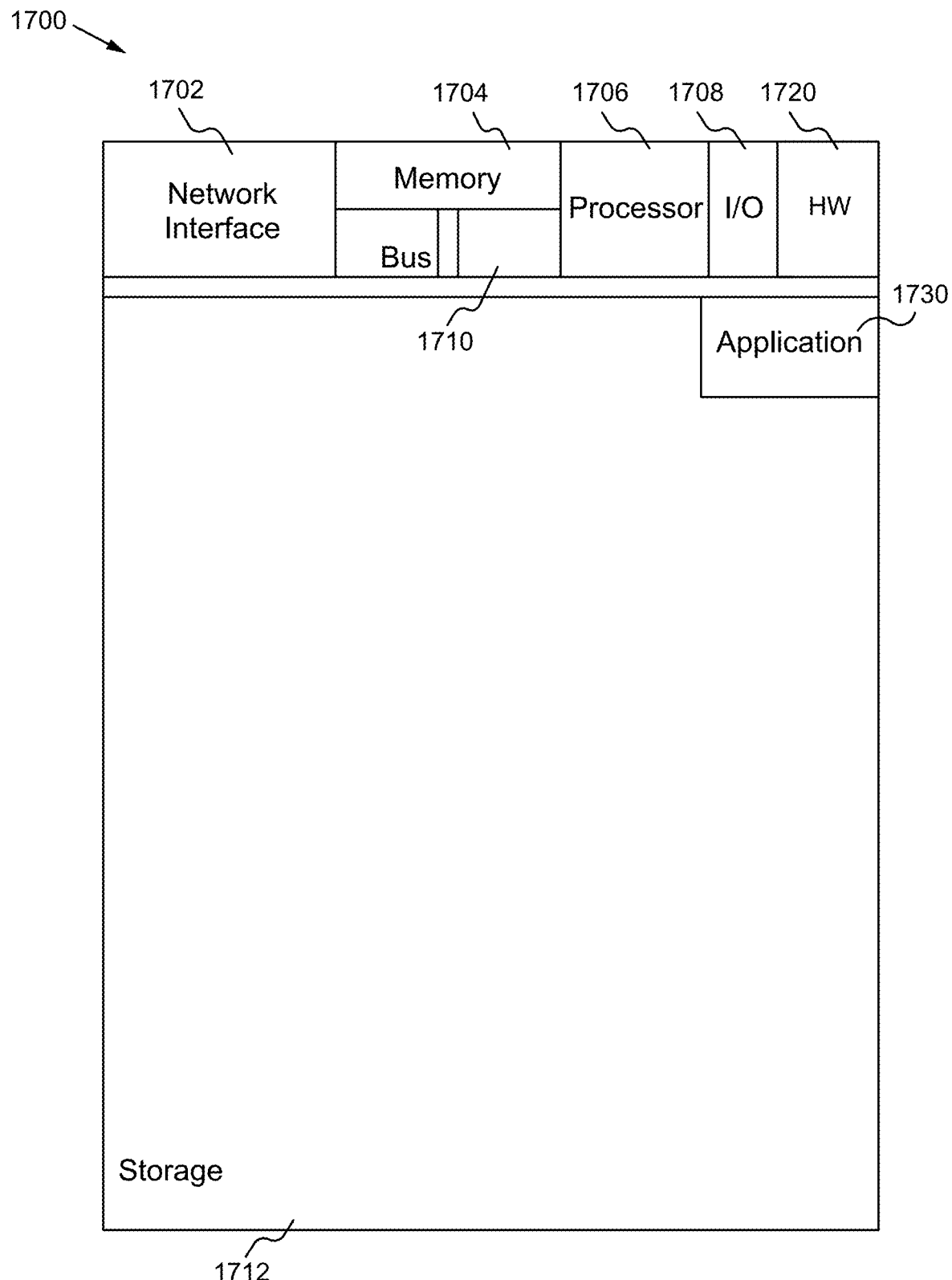
FIG. 17 illustrates a block diagram of an exemplary computing device configured to implement the personalized integrated video user experience according to some embodiments.

FIG. 17 illustrates a block diagram of an exemplary computing device configured to implement the personalized integrated video user experience according to some embodiments. The computing device 1700 is able to be used to acquire, store, compute, process, communicate and/or display information such as images, videos and audio. In general, a hardware structure suitable for implementing the computing device 1700 includes a network interface 1702, a memory 1704, a processor 1706, I/O device(s) 1708, a bus 1710 and a storage device 1712. The choice of processor is not critical as long as a suitable processor with sufficient speed is chosen. The memory 1704 is able to be any conventional computer memory known in the art. The storage device 1712 is able to include a hard drive, CDROM, CDRW, DVD, DVDRW, High Definition disc/drive, ultra-HD drive, flash memory card or any other storage device. The computing device 1700 is able to include one or more network interfaces 1702. An example of a network interface includes a network card connected to an Ethernet or other type of LAN. The I/O device(s) 1708 are able to include one or more of the following: keyboard, mouse, monitor, screen, printer, modem, touchscreen, button interface and other devices. Personalized integrated video user experience application(s) 1730 used to implement the personalized integrated video user experience are likely to be stored in the storage device 1712 and memory 1704 and processed as applications are typically processed. More or fewer components shown in FIG. 17 are able to be included in the computing device 1700. In some embodiments, personalized integrated video user experience hardware 1720 is included. Although the computing device 1700 in FIG. 17 includes applications 1730 and hardware 1720 for the personalized integrated video user experience, the personalized integrated video user experience is able to be implemented on a computing device in hardware, firmware, software or any combination thereof. For example, in some embodiments, the personalized integrated video user experience applications 1730 are programmed in a memory and executed using a processor. In another example, in some embodiments, the personalized integrated video user experience hardware 1720 is programmed hardware logic including gates specifically designed to implement the personalized integrated video user experience method.

In some embodiments, the personalized integrated video user experience application(s) 1730 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a game console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, smart jewelry (e.g., smart watch), a toy (e.g., stuffed animal, a plush toy) or any other suitable computing device.

To utilize the personalized integrated video user experience, a user accesses and interacts with the content using a device such as a smart phone, game console and television, tablet, personal computer, toy and/or any other appropriate device. The user is able to navigate and watch streaming content while also receiving contextual content.

In operation, the personalized integrated video user experience provides for a smooth user experience for viewing video content. Contextual content is available and unlocked as the user watches the content. The contextual content is integrated within the system, so that a user is able to browse or acquire related content without having to leave the system. Furthermore, while fast forwarding or rewinding content, the user is presented with an advertisement instead of a blank screen. Wireless mechanisms are able to be used to interact with content.

Some Embodiments of Personalized Integrated Video User Experience

1. A method programmed in a non-transitory memory of a device comprising:
   a. providing streaming content including a user interface overlay, wherein the streaming content is persistently streaming underneath the user interface overlay;
   b. displaying advertisement content within a video player during fast forwarding or rewinding of the streaming content;
   c. minimizing the user interface overlay during playback of the streaming content;
   d. providing contextual content related to the streaming content; and
   e. enabling interactivity and decision making with the contextual content.
2. The method of clause 1 wherein the advertisement content is targeted toward an end user based on at least one of demographics, purchasing behavior, browsing behavior, streaming behavior, and personal preferences.
3. The method of clause 1 wherein the contextual content appears after a user watches a specified position in the streaming content or after the user watches a specified amount of the streaming content.
4. The method of clause 1 wherein the contextual content is dynamically available such that a content owner is able to position and manage the contextual content at any time.
5. The method of clause 1 wherein the user interface in which an end user navigates to explore content available, includes: descriptions of the streaming content, a plurality of images corresponding to the streaming content and the descriptions of the streaming content, and the contextual content associated with the streaming content, wherein each image of the plurality of images fade in or appear from a side of a screen, wherein a graphic associated with the contextual content is displayed proximate to a corresponding image of the plurality of images of the streaming content.
6. The method of clause 5 wherein the user interface overlay is on top of the streaming content which includes full screen streaming content running in the background.
7. The method of clause 1 wherein the user interface enables a user to access metadata related to the streaming content while playing the streaming content, and a user is able to hide or display the metadata on the user interface overlay via action buttons.
8. The method of clause 1 wherein the user interface provides commerce activities, wherein at a specific point in the streaming content, a dynamically programmed pop-up is displayed which enables accessing the contextual content, further wherein accessing the contextual content includes purchasing music, providing coupons and promotional offerings and displaying bonus content.
9. The method of clause 1 further comprising communicating with a system using a plush toy, wherein the plush toy is configured to provide input to the device simulating a remote control, to control authentication, general navigation, educational interaction to gain rewards geared towards commerce, and digital/physical redemptions throughout the system.

10. The method of clause 9 wherein the plush toy is configured to receive information from the device in order to communicate back to an end user progress made, a recommendation for future viewing and a reward earned.

11. The method of clause 1 further comprising providing a content owner with a tool to modify the contextual content related to the streaming content, wherein the tool enables the content owner to select the contextual content and specify a time point or time amount to display the contextual content.

12. The method of clause 11 wherein the tool is accessible via a portal.

13. An apparatus comprising:
   a. a non-transitory memory for storing an application, the application for:
      i. providing streaming content including a user interface overlay, wherein the streaming content is persistently streaming underneath the user interface overlay;
      ii. displaying advertisement content within a video player during fast forwarding or rewinding of the streaming content;
      iii. minimizing the user interface overlay during playback of the streaming content;
      iv. providing contextual content related to the streaming content; and
      v. enabling interactivity with the contextual content; and
   b. a processing component coupled to the memory, the processing component configured for processing the application.

14. The apparatus of clause 13 wherein the advertisement content is targeted toward an end user based on at least one of demographics, purchasing behavior, browsing behavior, streaming behavior and personal preferences.

15. The apparatus of clause 13 wherein the contextual content appears after a user watches a specified position in the streaming content or after the user watches a specified amount of the streaming content.

16. The apparatus of clause 13 wherein the contextual content is dynamically available such that a content owner is able to position and manage the contextual content at any time.

17. The apparatus of clause 13 wherein the user interface in which an end user navigates to explore content available, includes: descriptions of the streaming content, a plurality of images corresponding to the streaming content and the descriptions of the streaming content, and the contextual content associated with the streaming content, wherein each image of the plurality of images fade in or appear from a side of a screen, wherein a graphic associated with the contextual content is displayed proximate to a corresponding image of the plurality of images of the streaming content.

18. The apparatus of clause 17 wherein the user interface overlay is on top of the streaming content which includes full screen streaming content running in the background.

19. The apparatus of clause 13 wherein the user interface enables a user to access metadata related to the streaming content while playing the streaming content, and a user is able to hide or display the metadata on the user interface overlay via action buttons.

20. The apparatus of clause 13 wherein the user interface provides commerce activities, wherein at a specific point in the streaming content, a dynamically programmed pop-up is displayed which enables accessing the contextual content, further wherein accessing the contextual content includes purchasing music, providing coupons and promotional offerings and displaying bonus content.

21. The apparatus of clause 13 wherein the application is further for communicating with a system using a plush toy, wherein the plush toy is configured to provide input to the apparatus simulating a remote control, to control authentication, general navigation, educational interaction to gain rewards geared towards commerce, and digital/physical redemptions throughout the system.

22. The apparatus of clause 21 wherein the plush toy is configured to receive information from the apparatus in order to communicate back to an end user progress made, a recommendation for future viewing and a reward earned.

23. The apparatus of clause 13 wherein the application is further for providing a content owner with a tool to modify the contextual content related to the streaming content, wherein the tool enables the content owner to select the contextual content and specify a time point or time amount to display the contextual content.

24. The apparatus of clause 23 wherein the tool is accessible via a portal.

25. A system comprising:
   a. a computing device configured for:
      i. providing streaming content including a user interface overlay;
      ii. providing contextual content related to the streaming content; and
      iii. enabling interactivity with the contextual content; and
   b. a plush toy device configured for communicating with the computing device, wherein communicating affects the streaming content and the contextual content.

26. The system of clause 25 wherein the plush toy device includes a plurality of Near Field Communication (NFC) chips for communicating with the computing device, further wherein a first NFC chip of the plurality of NFC chips is positioned in a first location of the plush toy device and a second NFC chip of the plurality of NFC chips is positioned in a second location of the plush toy device.

27. The system of clause 26 wherein the first location is a left hand/palm of the plush toy device and the second location is a right hand/palm of the plush toy device.

28. The system of clause 25 wherein the plush toy device includes a wireless technology mechanism configured for exchanging data over short distances for communicating with the computing device.

29. The system of clause 25 wherein the plush toy device includes a wireless communication device for communicating with the computing device.

30. The system of clause 25 wherein the plush toy device includes an identification component which the computing device detects to identify the identity or character of the plush toy device, further wherein the identity or character of the plush toy device determines the streaming content and the contextual content.

31. The system of clause 25 wherein the plush toy device includes a user identification component which the computing device detects to identify the user of the plush toy device, further wherein the user of the plush toy device determines the streaming content and the contextual content.

32. The system of clause 25 wherein the plush toy device includes a speaker device to communicate suggestions, acting in place of a recommendation engine, to a user, further wherein the computing device communicates to the plush toy device to communicate with the user based on actions by the user.

33. The system of clause 25 wherein the plush toy device provides a user with an ability to interact on a plurality of educational games and interactions, further promoting rewards geared toward merchandise redemption and purchase, by having the user use NFC chips of the plush toy to answer questions posed during streaming content.

34. An apparatus comprising:
    a. a plush toy body; and
    b. a communication device positioned within the plush toy body configured for communicating with a video device.

35. The apparatus of clause 34 wherein the plush toy body includes a plurality of Near Field Communication (NFC) chips for communicating with the video device, further wherein a first NFC chip of the plurality of NFC chips is positioned in a first location of the plush toy body and a second NFC chip of the plurality of NFC chips is positioned in a second location of the plush toy body.

36. The apparatus of clause 35 wherein the first location is a left hand/palm of the plush toy device and the second location is a right hand/palm of the plush toy device.

37. The apparatus of clause 34 wherein the plush toy device includes a wireless technology mechanism configured for exchanging data over short distances for communicating with the computing device.

38. The apparatus of clause 34 wherein the plush toy body includes a wireless communication device for communicating with the video device.

39. The apparatus of clause 34 wherein the plush toy body includes an identification component which the video device detects to identify the identity or character of the plush toy body, further wherein the identity or character of the plush toy body determines the streaming content and the contextual content.

40. The apparatus of clause 34 wherein the plush toy body includes a user identification component which the video device detects to identify the user of the plush toy device, further wherein the user of the plush toy body determines the streaming content and the contextual content.

41. The apparatus of clause 34 wherein the plush toy body includes a speaker device to communicate suggestions, acting in place of a recommendation engine, to a user, further wherein the computing device communicates to the plush toy body to communicate with the user based on actions by the user.

42. The apparatus of clause 34 wherein the plush toy body provides a user with an ability to interact on a plurality of educational games and interactions, further promoting rewards geared toward merchandise redemption and purchase, by having the user use NFC chips of the plush toy body to answer questions posed during streaming content.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
    a. providing streaming content including a user interface overlay, wherein the streaming content is persistently streaming underneath the user interface overlay, wherein multiple versions of the streaming content are stored, wherein a user who is subscriber of the streaming content receives the streaming content at a higher bandwidth than a non-subscriber;
    b. displaying advertisement content within a video player during fast forwarding or rewinding of the streaming content;
    c. minimizing the user interface overlay during playback of the streaming content;
    d. providing contextual content related to the streaming content; and
    e. enabling interactivity and decision making with the contextual content, wherein the contextual content is initially locked, and the contextual content is unlocked after the user watches a specified position in the streaming content or after the user watches a specified amount of the streaming content, wherein the locked contextual content is visible but not accessible.

2. The method of claim 1 wherein the advertisement content is targeted toward an end user based on at least one of demographics, purchasing behavior, browsing behavior, streaming behavior, and personal preferences.

3. The method of claim 1 wherein the contextual content is dynamically available such that a content owner is able to position and manage the contextual content at any time.

4. The method of claim 1 wherein the user interface in which an end user navigates to explore content available, includes: descriptions of the streaming content, a plurality of images corresponding to the streaming content and the descriptions of the streaming content, and the contextual content associated with the streaming content, wherein each image of the plurality of images fade in or appear from a side of a screen, wherein a graphic associated with the contextual content is displayed proximate to a corresponding image of the plurality of images of the streaming content.

5. The method of claim 4 wherein the user interface overlay is on top of the streaming content which includes full screen streaming content running in the background.

6. The method of claim 1 wherein the user interface enables a user to access metadata related to the streaming content while playing the streaming content, and a user is able to hide or display the metadata on the user interface overlay via action buttons.

7. The method of claim 1 wherein the user interface provides commerce activities, wherein at a specific point in the streaming content, a dynamically programmed pop-up is displayed which enables accessing the contextual content, further wherein accessing the contextual content includes purchasing music, providing coupons and promotional offerings and displaying bonus content.

8. The method of claim 1 further comprising providing a content owner with a tool to modify the contextual content related to the streaming content, wherein the tool enables the content owner to select the contextual content and specify a time point or time amount to display the contextual content.

9. The method of claim 8 wherein the tool is accessible via a portal.

10. An apparatus comprising:
    a. a non-transitory memory for storing an application, the application for:

i. providing streaming content including a user interface overlay, wherein the streaming content is persistently streaming underneath the user interface overlay, wherein multiple versions of the streaming content are stored, wherein a user who is a subscriber of the streaming content receives the streaming content at a higher bandwidth than a non-subscriber;

ii. displaying advertisement content within a video player during fast forwarding or rewinding of the streaming content;

iii. minimizing the user interface overlay during playback of the streaming content;

iv. providing contextual content related to the streaming content; and v. enabling interactivity with the contextual content, wherein the contextual content is initially locked, and the contextual content is unlocked after the user watches a specified amount of the streaming content, wherein the locked contextual content is visible but not accessible, wherein the specified amount of the streaming content includes a cumulative amount able to be achieved by skipping around the streaming content, wherein the contextual content includes video or audio from the streaming content; and b. a processing component coupled to the memory, the processing component configured for processing the application.

11. The apparatus of claim 10 wherein the advertisement content is targeted toward an end user based on at least one of demographics, purchasing behavior, browsing behavior, streaming behavior and personal preferences.

12. The apparatus of claim 10 wherein the contextual content is dynamically available such that a content owner is able to position and manage the contextual content at any time.

13. The apparatus of claim 10 wherein the user interface in which an end user navigates to explore content available, includes: descriptions of the streaming content, a plurality of images corresponding to the streaming content and the descriptions of the streaming content, and the contextual content associated with the streaming content, wherein each image of the plurality of images fade in or appear from a side of a screen, wherein a graphic associated with the contextual content is displayed proximate to a corresponding image of the plurality of images of the streaming content.

14. The apparatus of claim 13 wherein the user interface overlay is on top of the streaming content which includes full screen streaming content running in the background.

15. The apparatus of claim 10 wherein the user interface enables the user to access metadata related to the streaming content while playing the streaming content, and a user is able to hide or display the metadata on the user interface overlay via action buttons.

16. The apparatus of claim 10 wherein the user interface provides commerce activities, wherein at a specific point in the streaming content, a dynamically programmed pop-up is displayed which enables accessing the contextual content, further wherein accessing the contextual content includes purchasing music, providing coupons and promotional offerings and displaying bonus content.

17. The apparatus of claim 10 wherein the application is further for providing a content owner with a tool to modify the contextual content related to the streaming content, wherein the tool enables the content owner to select the contextual content and specify a time point or time amount to display the contextual content.

18. The apparatus of claim 17 wherein the tool is accessible via a portal.

19. The method of claim 1 further comprising receiving exercise-related information from a wearable fitness device, wherein the advertisement content is based on the exercise-related information.

20. The method of claim 1 further comprising monitoring the user with a camera device to determine that the user is watching a screen of the device by detecting eyes of the user with the camera device, and pausing the video when the yes of the user are not watching the screen.

* * * * *